United States Patent
Park et al.

(10) Patent No.: US 9,357,094 B2
(45) Date of Patent: May 31, 2016

(54) IMAGE FORMING APPARATUS SUPPORTING PEER-TO-PEER CONNECTION AND METHOD OF MANAGING CHANNEL THEREOF

(71) Applicant: Samsung Electronics Co., Ltd., Suwon-si (KR)

(72) Inventors: Sung-joon Park, Hwaseong-si (KR); Jin-hyung Kim, Suwon-si (KR); Hyun-wook Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/712,220

(22) Filed: Dec. 12, 2012

(65) Prior Publication Data

US 2013/0148161 A1   Jun. 13, 2013

Related U.S. Application Data

(60) Provisional application No. 61/569,391, filed on Dec. 12, 2011.

(51) Int. Cl.
*G06F 3/12* (2006.01)
*G06K 15/00* (2006.01)
(Continued)

(52) U.S. Cl.
CPC .......... *H04N 1/00954* (2013.01); *G06F 3/1204* (2013.01); *G06F 3/1236* (2013.01); *G06F 3/1292* (2013.01); *G06F 3/1296* (2013.01);
(Continued)

(58) Field of Classification Search
CPC .. H04W 92/10; H04W 76/023; H04L 67/104; H04L 29/08522; H04L 29/08306; H04L 29/06326
See application file for complete search history.

(56) References Cited

U.S. PATENT DOCUMENTS 8,929,822 B2   1/2015  Jung et al.
2003/0149778 A1   8/2003  Robinson et al.
(Continued)

FOREIGN PATENT DOCUMENTS

EP   2390782 A2   11/2011
EP   2 645 691 A2   10/2013
(Continued)

OTHER PUBLICATIONS

Wi-Fi Peer-to-Peer (P2P) Technical Specification v1.2, Wi-Fi Alliance Technical Committee P2P Task Group, 2010 WiFi Alliance, 159 pages.*

(Continued)

*Primary Examiner* — Thomas Lett
(74) *Attorney, Agent, or Firm* — Staas & Halsey LLP

(57) ABSTRACT

Provided is a multi-function printer (MFP) supporting Wi-Fi Direct. The MFP includes a print engine to perform a printing operation, a first wireless interface to connect the MFP to an access point (AP) of an infrastructured network, a second wireless interface to connect the MFP to an external wireless terminal in a Wi-Fi Direct, a soft AP to allow the MFP to perform as an AP when the MFP is Wi-Fi Direct connected, and a dynamic host configuration protocol (DHCP) server unit allocating an internet protocol (IP) address to the wireless device that is Wi-Fi Direct connected to the MFP, where the MFP is simultaneously connected to an AP of the infrastructured network and an external wireless terminal via the first wireless interface and the second wireless interface by using one channel.

25 Claims, 20 Drawing Sheets

(51) Int. Cl.
*H04N 1/00* (2006.01)
*H04W 76/02* (2009.01)

(52) U.S. Cl.
CPC ............ *G06K 15/00* (2013.01); *G06K 15/4045* (2013.01); *H04N 1/00214* (2013.01); *H04N 1/00307* (2013.01); *H04W 76/025* (2013.01); *G06K 15/4005* (2013.01); *H04W 76/023* (2013.01); *Y02B 60/1271* (2013.01)

(56) References Cited

U.S. PATENT DOCUMENTS

| | | |
|---|---|---|
| 2003/0156567 A1 | 8/2003 | Oak |
| 2004/0176134 A1 | 9/2004 | Goldthwaite et al. |
| 2005/0147049 A1 | 7/2005 | Ganesan |
| 2009/0017843 A1 | 1/2009 | Laroia et al. |
| 2011/0026504 A1* | 2/2011 | Feinberg ............... 370/338 |
| 2011/0063663 A1 | 3/2011 | Kim et al. |
| 2011/0082940 A1* | 4/2011 | Montemurro ........ H04L 69/24 709/227 |
| 2011/0085529 A1 | 4/2011 | Choi et al. |
| 2011/0185183 A1 | 7/2011 | Yamamoto |
| 2011/0225305 A1 | 9/2011 | Vedantham et al. |
| 2012/0034868 A1 | 2/2012 | Fine et al |
| 2012/0224569 A1* | 9/2012 | Kubota ............... 370/338 |
| 2013/0044635 A1* | 2/2013 | Suzuki ............. H04W 76/023 370/254 |
| 2013/0057897 A1 | 3/2013 | Park et al. |
| 2013/0057898 A1 | 3/2013 | Park et al. |
| 2013/0215467 A1 | 8/2013 | Fein et al |
| 2013/0229685 A1 | 9/2013 | Naruse |

FOREIGN PATENT DOCUMENTS

| | | |
|---|---|---|
| EP | 2 811 720 A2 | 12/2014 |
| EP | 2 840 529 | 2/2015 |
| KR | 1020110040025 | 4/2011 |
| KR | 1020110096831 | 8/2011 |
| KR | 10-2013-0025745 | 3/2013 |
| KR | 10-2013-0025747 | 3/2013 |
| KR | 10-2013-0025749 | 3/2013 |
| WO | 2009009394 | 1/2009 |

OTHER PUBLICATIONS

International Search Report dated Mar. 25, 2013 issued in International Application No. PCT/KR2012/010807.
Extended European Search Report dated May 17, 2013 issued in EP Application No. 12196634.5.
Extended European Search Report dated May 24, 2013 issued in EP Application No. 12196808.5.
Extended European Search Report dated May 24, 2013 issued in EP Application No. 12196617.0.
European Office Action dated Oct. 7, 2014 in corresponding European Patent Application No. 12196617.0, 7 pages.
"UPnP Device Architecture 1.0", Jul. 20, 2006, <http:\www.upnp-ic.org/resources/UPnP_device_architecture_docs/UPnP-DeviceArchitecture-v1_0-20060720.pdf, 80 pages.
European Search Report issued May 22, 2015 in corresponding European Patent Application No. 1510424.8.
European Search Report issued Jun. 10, 2015 in corresponding European Patent Application No. 15150424.8.
European Search Report issued Feb. 8, 2016 in corresponding European Patent Application No. 15162047.3.
"Near Field Communication—Interface and Protocol (NFCIP-1), 3$^{rd}$ Edition", Jun. 11, 2013, XP055119636, Ecma General Assembly Jun. 2013 Retrieved from Internet: http://www.ecma-international.org/publications/files/ECMA-ST/Ecma-340.pdf.

\* cited by examiner

IMAGE FORMING APPARATUS SUPPORTING PEER-TO-PEER CONNECTION AND METHOD OF MANAGING CHANNEL THEREOF

CROSS-REFERENCE TO RELATED APPLICATIONS

This application claims the benefit of U.S. Provisional Patent Application No. 61/569,391, filed on Dec. 12, 2011, in the U.S. Patent and Trademark Office, the disclosures of which are incorporated herein in their entirety by reference.

BACKGROUND OF THE INVENTION

1. Field of the Invention

The present general inventive concept relates to an image forming apparatus supporting peer to peer (P2P) connection, and more particularly, to a method of managing channels in an image forming apparatus supporting P2P connection.

2. Description of the Related Art

Recently, peer to peer (P2P) communication technology, by which wireless devices may be directly connected to each other without an additional wireless connecting apparatus, have been generalized and widely used. For example, Bluetooth technology makes the P2P communication possible. Although there are limitations in terms of transmission speed and transmission range of Bluetooth, new versions of Bluetooth are being developed to compensate for the limitations.

In addition, Wi-Fi, which is a wireless local area network (WLAN) standard based on IEEE 802.11 regulated by the Wi-Fi alliance is basically a technology using ultra-high speed Internet by accessing access points (APs) connected to an infrastructured network; however, the Wi-Fi may serve the P2P communication by using an ad-hoc function. However, when the ad-hoc function is used, security is weakened, a transmission speed is lowered, and a setting method is not easily performed. Therefore, the Wi-Fi alliance has suggested a Wi-Fi Direct technology that makes the P2P communication possible. The Wi-Fi Direct allows P2P connection between wireless devices without using the AP, supports a transmission speed of a maximum of 250 Mbps, and performs security settings by using Wi-Fi protected access 2 (WPA2), in order to address problems of the ad-hoc function. In addition, the Wi-Fi Direct supports a transmission range of a maximum of 200 meters (m), and thus, is considered as a substitute for the P2P communication.

SUMMARY OF THE INVENTION

With Wi-Fi Direct, the utilization of the P2P communication may be increased. The P2P communication technology may be applied to image forming apparatuses such as printers, scanners, facsimiles, and multi-function printers. Therefore, technologies to safely and conveniently use an image forming apparatus to support the P2P connection are desirable.

The present general inventive concept provides a method of setting channels used in a peer-to-peer (P2P) connection to be the same as channels used in connection to an infrastructured network in an image forming apparatus supporting the P2P connection.

Additional features and utilities of the present general inventive concept will be set forth in part in the description which follows and, in part, will be obvious from the description, or may be learned by practice of the general inventive concept.

Exemplary embodiments of the present general inventive concept provide a multi-function printer (MFP) supporting a Wi-Fi Direct, the MFP including a print engine to perform a printing operation, a first wireless interface connecting the MFP to an access point (AP) of an infrastructured network, a second wireless interface to connect the MFP to an external wireless terminal in a Wi-Fi Direct, a soft AP to allow the MFP to perform as an AP when the MFP is Wi-Fi Direct connected, and a dynamic host configuration protocol (DHCP) server unit allocating an internet protocol (IP) address to the wireless device that is Wi-Fi Direct connected to the MFP, where the MFP is simultaneously connected to an AP of the infrastructured network and an external wireless terminal via the first wireless interface and the second wireless interface by using one channel.

Exemplary embodiments of the present general inventive concept may also provide a method of managing a channel in a multi-function printer (MFP) supporting the Wi-Fi Direct, the method including connecting the MFP to an AP of an infrastructured network via a first wireless interface, and connecting the MFP to an external wireless terminal in a Wi-Fi Direct via a second wireless interface by using a channel used in the connection via the first wireless interface.

Exemplary embodiments of the present general inventive concept may also prove a method of managing a channel in a multi-function printer (MFP) supporting Wi-Fi Direct, the method including connecting the MFP to an AP of an infrastructured network via a first wireless interface, and determining whether the MFP is Wi-Fi Direct connected to an external wireless device via a second wireless interface, if the MFP is Wi-Fi Direct connected to the external wireless terminal, determining whether a channel used in the connection via the first wireless interface is the same as a channel used in the connection via the second wireless interface, and if the channels are not the same as each other, changing the channel used in the connection via the second wireless interface to be the same as the channel used in the connection via the first wireless interface.

Exemplary embodiments of the present general inventive concept may also provide a method of managing channels in a multi-function printer (MFP) supporting Wi-Fi Direct, the method comprising setting a channel used to connect the MFP to an infrastructured network access point (AP) as a Wi-Fi Direct operation channel, and activating the Wi-Fi Direct using the set channel.

The setting the channel in the method may include determining whether the MFP is currently connected to the AP of the infrastructure network, checking the channel to be connected to the AP when the MFP is determined to be currently connected to the AP of the infrastructure network, and setting the checked channel as the channel as the Wi-Fi Direct operation channel.

The setting the channel in the method may include determining whether the MFP is currently connected to the AP of the infrastructure network, and determining whether the MFP has been previously connected to the AP of the infrastructure network when the MFP is determined to be currently connected to the AP of the infrastructure network, checking the channel used in a last connection to the AP, when it is determined that the MFP has been previously connected to the AP of the infrastructure network, and setting the checked channel as the channel used to be connected to the Wi-Fi Direct.

The method may also include determining whether the MFP is currently connected to the AP of the infrastructure network, and determining whether the MFP has been previously connected to the AP of the infrastructure network when the MFP is determined not to be currently connected to the AP of the infrastructure network, and setting an arbitrary channel as the Wi-Fi Direct operation channel.

Exemplary embodiments of the present general inventive concept may also include a method of setting a Wi-Fi Direct operation channel, the method including connecting a multi-function printer (MFP) to an access point (AP) of an infrastructure network, checking a channel used to be connected to the AP, storing information on the checked channel, and setting the stored channel as the Wi-Fi Direct operation channel.

The method may include determining whether the Wi-Fi Direct is currently activated when the information on the checked channel is stored, checking the Wi-Fi Direct operation channel when the Wi-Fi Direct is currently activated, determining whether the Wi-Fi direct operation channel is the same as the stored channel, stopping a Wi-Fi Direct operation when the Wi-Fi direct operation channel is different from the stored channel, and activating Wi-Fi direct by using the stored channel.

The method may include determining whether the Wi-Fi Direct is currently activated when the information on the checked channel is stored, determining if the Wi-Fi Direct activation request is received when the Wi-Fi Direct is not currently activated, and activating Wi-Fi direct by using the stored channel.

The method may include releasing the connection to the AP when the information on the checked channel is stored, receiving a Wi-Fi Direct activation request, and activating the Wi-Fi Direct using stored channel.

Exemplary embodiments of the present general inventive concept may also provide a method of setting a Wi-Fi Direct operation channel in a state when Wi-Fi direct of the multi-function printer (MFP) is activated, the method including connecting the MFP to an access point (AP) of the infrastructure network when the Wi-Fi Direct is activated, checking the Wi-Fi Direct operation channel and channel used to be connected to the AP, determining if the Wi-Fi Direct operation channel is the same as a channel used to be connected to the AP, and stopping the Wi-Fi Direction operation and activating Wi-Fi Direct by using the channel used to be connected to the AP when the Wi-Fi Direct operation channel is the same as a channel used to be connected to the AP.

The method may include maintaining the Wi-Fi direct in an activated stated when the Wi-Fi Direct operation channel is different from the channel used to be connected to the AP.

Exemplary embodiments of the present general inventive concept may also provide a method of changing an operation mode of a multifunction printer (MFP) supporting Wi-Fi Direct, the method including receiving a Wi-Fi Direct activation request, determining whether the MFP currently operates in an ad-hoc mode, stopping the ad-hoc mode when it is determined that the the MFP currently operates in an ad-hoc mode, and activating the Wi-Fi Direct according to the received activation request.

The method may include changing the ad-hoc mode into an infrastructure mode when it is determined that the MFP currently operates in an ad-hoc mode, and changing a service set identifier (SSDI) to a null state to terminate the ad-hoc mode.

The method may include that when it is determined that the MFP does not currently operate in the ad-hoc mode, activating the Wi-Fi Direct according to the received activation request.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
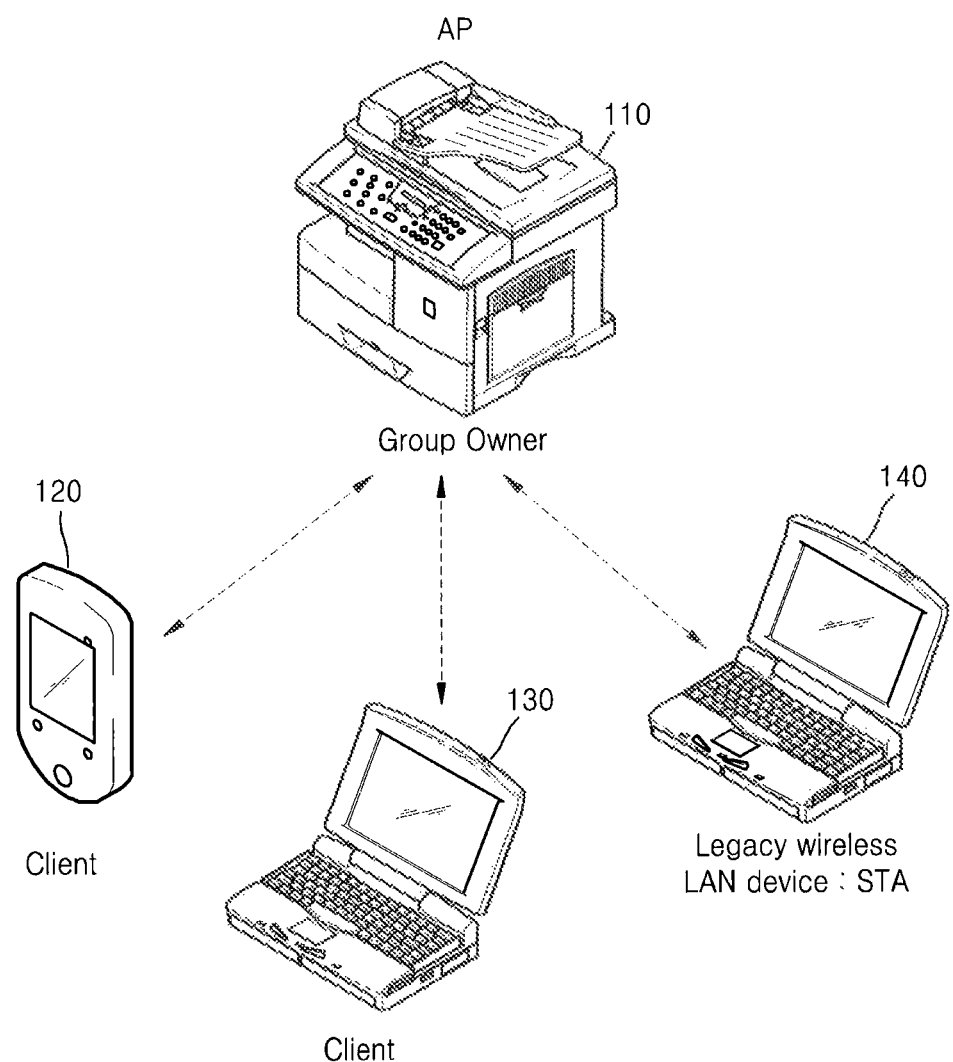
FIG. 1 is a diagram illustrating devices supporting Wi-Fi Direct and legacy wireless local area network (WLAN) devices that are wirelessly connected to each other to form a wireless network according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Expressions such as "at least one of," when preceding a list of elements, modify the entire list of elements and do not modify the individual elements of the list.

Hereinafter, a multi-function printer (MFP) that supports Wi-Fi Direct will be described as an example of an image forming apparatus supporting a peer-to-peer (P2P) connection. The MFP of the exemplary embodiments of the present general inventive concept may include a scanning unit to scan at least one document so as to form an image, a fax module to transmit and receive fax data via a wired and/or wireless communication network, and a print engine to print one or more documents according to data stored within the MFP and/or receive by the MFP. However, the scope of the present invention to be protected is not limited thereto, but is defined by descriptions of claims.

Before describing the exemplary embodiments of the present general inventive concept, connections and operations of an MFP that supports the Wi-Fi Direct will be described with reference to accompanying drawings.

FIG. 1 is a diagram illustrating wireless local area network (WLAN) devices supporting Wi-Fi Direct and a legacy WLAN device connecting to each other to form a wireless network according to exemplary embodiments of the present general inventive concept. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 denotes a conventional laptop computer which adopts a WLAN technology and does not support the Wi-Fi Direct. The MFP 110 may include a scanning unit to scan at least one document so as to form an image, a fax module to transmit and receive fax data via a wired and/or wireless communication network, and a print engine to print one or more documents according to data stored within the MFP and/or received by the MFP via the wired and/or wireless communication network.

The WLAN device supporting the Wi-Fi Direct (hereinafter, referred to as "Wi-Fi Direct device") may perform a P2P connection without using an infrastructured network, unlike conventional devices supporting Wi-Fi. In more detail, according to the conventional Wi-Fi technology, a Wi-Fi device is wirelessly connected to a router, that is, an access point (AP), connected to an infrastructured network that is configured in advance in order to form a wireless network. Here, the Wi-Fi devices, which are wirelessly connected to the AP, function as stations. However, with the Wi-Fi Direct devices illustrated in FIG. 1, one of the Wi-Fi Direct devices that are to form the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without the AP connected to the infrastructured network. When the wireless network is formed between the Wi-Fi direct devices, the legacy WLAN devices such as the Wi-Fi devices may recognize the Wi-Fi direct device operates as the AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to the infrastructured network. The devices 110, 120, and 130 are merely exemplary devices, and other devices may form a wireless network without an AP connected to the infrastructure network. Other devices may include, for example, a personal computer, a tablet computer, a server, a portable media player, a home media server, and/or any other suitable devices to carry out the exemplary embodiments of the present general inventive concept. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. The Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes the GO, that is, the Wi-Fi Direct MFP 110, as the AP, and is wirelessly connected to the GO to be connected to the wireless network formed by the Wi-Fi direct devices.

In FIG. 1, the Wi-Fi Direct MFP 110 operates as the GO; however, any one of the other Wi-Fi direct devices, that is, the smartphone 120 and the laptop computer 130, may operate as the GO and the MFP 110 may operate as the client. Which of the Wi-Fi direct devices to become the GO is determined through a negotiation process in Wi-Fi direct connection processes, and this will be described in detail later. The Wi-Fi direct device may be the GO by itself before the connection without any negotiation, and the Wi-Fi direct device in this case is referred to as an autonomous group owner (AGO). A wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 illustrates an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the scope of the present invention is not limited thereto, that is, embodiments of the present invention may be applied to printers, scanners, or facsimiles supporting the Wi-Fi Direct. In addition, the Wi-Fi Direct is used as an example of the P2P communication method; however, other kinds of P2P communication such as Bluetooth and Zigbee may be used within the applicable range of the present invention.

Figure 2:
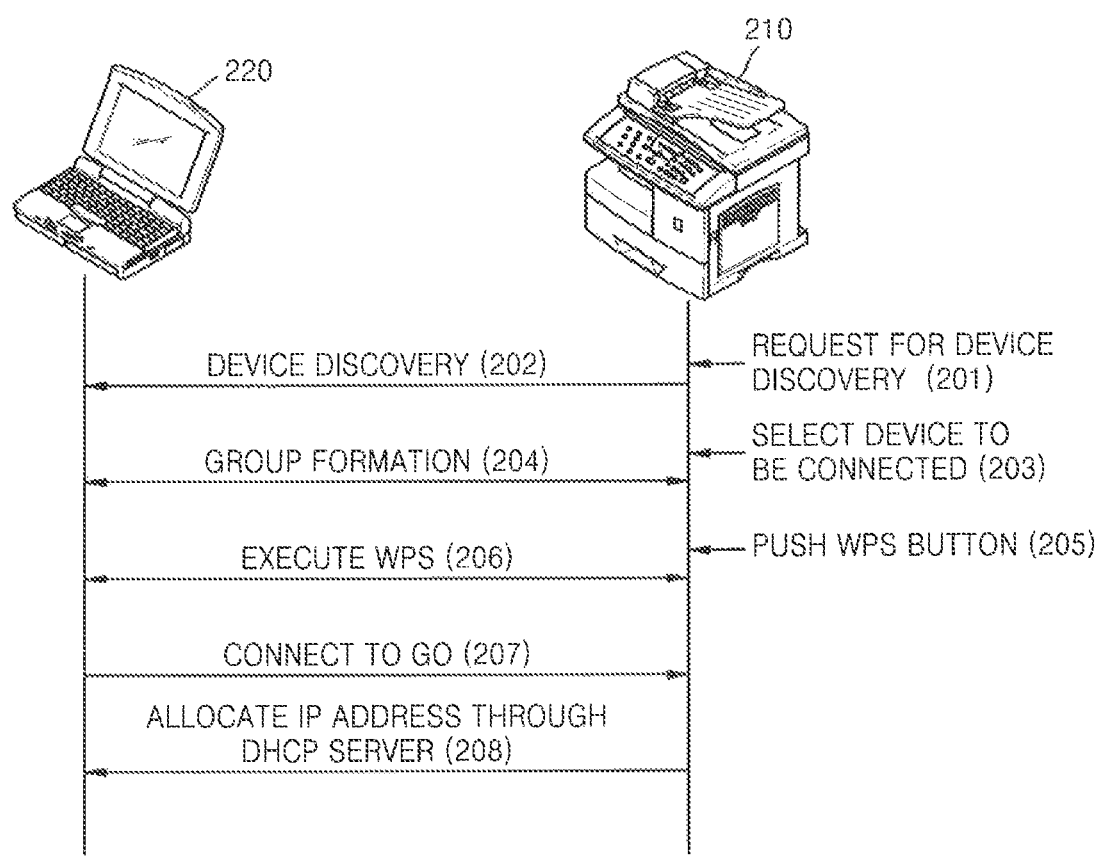
FIG. 2 is a diagram illustrating processes of wirelessly connecting the devices supporting the Wi-Fi Direct to each other according to exemplary embodiments of the present general inventive concept.

FIG. 2 is a diagram illustrating processes of wirelessly connecting Wi-Fi Direct devices to each other according to exemplary embodiments of the present general inventive concept. In more detail, processes of Wi-Fi Direct connection between a Wi-Fi Direct MFP 210 and a Wi-Fi Direct laptop computer 220 are illustrated. The Wi-Fi Direct MFP 210 may be similar to and/or the same as the MFP 110 illustrated in FIG. 1 and described above. The Wi-Fi Direct connecting processes may be divided as a device discovery process, a group formation process, and a secure connection process. Referring to FIG. 2, the Wi-Fi Direct MFP 210 receives a request for device discovery from a user (e.g., at operation 201 illustrated in FIG. 2), and searches for a Wi-Fi Direct device around it (e.g. at operation 202). The device discovery request may be input through a user interface of the MFP 210, for example, a user interface realized on a display unit such as a liquid crystal display (LCD) formed in the MFP 210. If it is determined as a result of searching that there is a Wi-Fi Direct device around the MFP 210, the MFP 210 illustrates the user the searched device through the display unit and receives a connection request at operation 203 from the user. The connection request at operation 203 may be also input through the display unit of the MFP 210 from the user, for example, the user may push buttons or a touch panel of the display unit. If there are a plurality of Wi-Fi Direct devices, the MFP 210 displays a list of the searched Wi-Fi direct devices on the display unit so that the user may select one of the Wi-Fi direct devices and request the connection to the selected Wi-Fi direct device.

After receiving the connection request at operation 203, a group formation is performed between the Wi-Fi Direct devices to be connected (e.g., at operation 204 illustrated in FIG. 2). The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed (e.g., at operation 204), the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. In exemplary embodiments of the present general inventive concept, the user pushes (i.e., selects) a WPS button provided on the MFP 210 to request the secure connection (e.g., at operation 205). Alternatively, the secure connection between the devices can be made automatically when one the device to be connected is selected at operation 203, and the group is formed at operation 204.

Within a predetermined period of time (e.g., 120 seconds and/or any other suitable time period), the secure connection may be achieved by pushing a WPS button formed on the MFP 201, on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks (i.e., selects) the WPS button represented on the display unit of the laptop computer 220 by using a mouse, for example, to request the secure connection. When the security connection is requested by pushing the WPS button, the device that is determined to be the GO in the group formation process transmits security information to devices determined as the clients (e.g., at operation 206 illustrated in FIG. 2). According to the Wi-Fi Direct, the secure connection is executed after encrypting in a Wi-Fi protected access 2 (WPA2)-pre-shared key (PSK) method, and thus, the Wi-Fi Direct may have increased security than that of a conventional wired equivalent privacy (WEP) or Wi-Fi protected access (WAP) method.

When the WPS is executed, the Wi-Fi direct device that is the client is connected to the Wi-Fi direct device that is the GO (e.g., at operation 207 illustrated in FIG. 2). The Wi-Fi Direct device that is the GO automatically allocates an Internet protocol (IP) address to the Wi-Fi direct device that is the client by using a dynamic host configuration protocol (DHCP) server (e.g., at operation 208), and then, the P2P connection between the Wi-Fi Direct devices is completed.

Exemplary processes to connect the Wi-Fi direct devices have been described so far, and exemplary detailed processes and characteristics of the Wi-Fi Direct technology will be described with reference to the accompanying drawings as follows.

Figure 3:
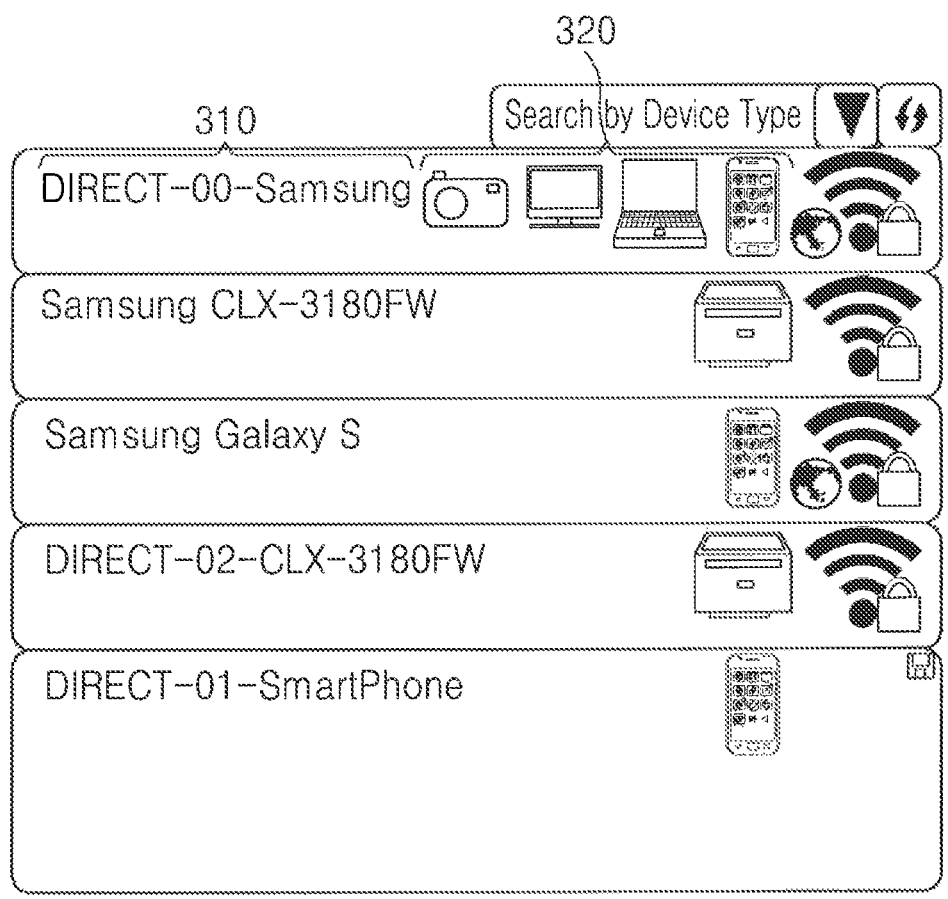
FIG. 3 is a diagram illustrating an example of displaying a list of Wi-Fi Direct devices that are found after a device discovery process performed by a device supporting the Wi-Fi Direct according to exemplary embodiments of the present general inventive concept.

FIG. 3 is a diagram illustrating an example of displaying a list of the Wi-Fi Direct devices that are searched in the device discovery process in the Wi-Fi Direct device according to exemplary embodiments of the present general inventive concept. When the device discovery process is performed by the Wi-Fi direct device, device information (e.g., the device information 310 illustrated in FIG. 3) such as a type of the device and a service set identifier (SSID) of the device is exchanged between the devices through a probe request and a probe response that are WLAN packets, and the Wi-Fi direct device that performs the device discovery process displays the collected information. As illustrated in FIG. 3, the SSIDs and the types of the searched Wi-Fi Direct devices are represented as text or icons (e.g., as device icons 320 illustrated in FIG. 3). Here, all of the searched devices may be represented in the list; however, the devices may be filtered so that the devices of a desired type may be only displayed in the list. That is, one or more searched devices may be displayed in the list, where all of the devices that are searched may be displayed, or a portion and/or subset of all of the searched devices may be displayed.

According to the Wi-Fi Direct technology of the exemplary embodiments of the present general inventive concept, the Wi-Fi direct devices are defined in category units. The Wi-Fi Direct devices may be classified as categories that may include, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
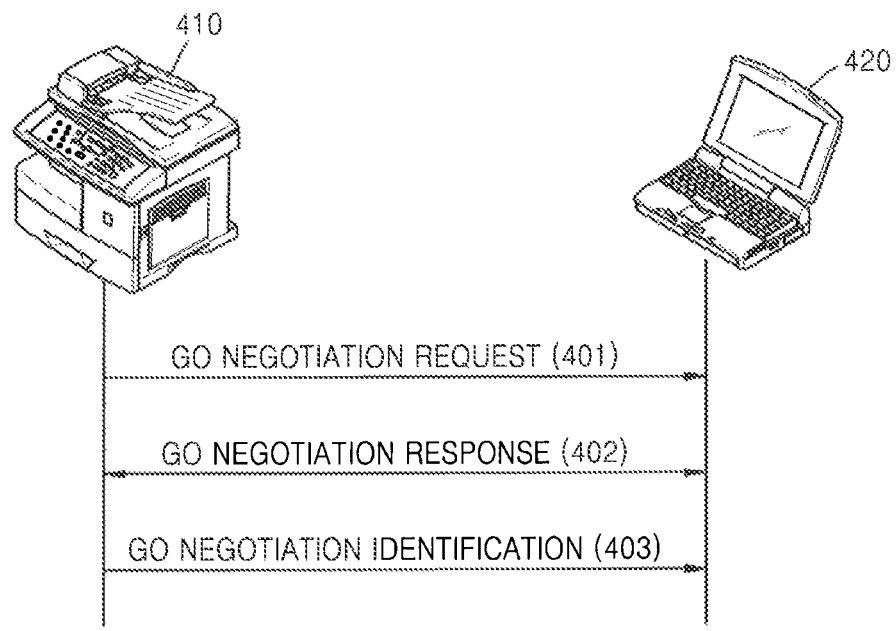
FIG. 4 is a diagram illustrating a group formation process in the processes of connecting the Wi-Fi Direct supporting devices to each other according to exemplary embodiments of the present general inventive concept.

FIG. 4 is a diagram illustrating the group formation process in detail among the connecting processes between the Wi-Fi Direct devices according to exemplary embodiments of the present general inventive concept. The group formation process is a process for determining the Wi-Fi Direct devices that are to form a network, and the Wi-Fi Direct devices to be the GO and the clients.

For example, when the Wi-Fi direct MFP 410 performs the device discovery and selects a laptop computer 420 among the discovered Wi-Fi Direct devices to be connected, the MFP 410 transmits a GO negotiation request to the laptop computer 420 (e.g., operation 401 illustrated in FIG. 4). The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. Here, the intent value is a value representing a degree of task intent in each device, and is determined by manufacturer policy and user settings. The intent value of the device (e.g., where the device is supplied power always), may be set to be a predetermined value (e.g., set to a relatively high value).

As described above, after determining the Wi-Fi Direct device to be the GO by comparing the intent values, the laptop computer 420 transmits the determination result to the MFP 410 as a response to the GO negotiation (e.g., operation 402 illustrated in FIG. 4). The MFP 410 that receives the determination result transmits an acknowledgement to the laptop computer 420 (e.g., operation 403 illustrated in FIG. 4) in order to verify the receipt of the negotiation, and then, the group formation process is finished. When the group formation is completed, the Wi-Fi Direct device that is the GO manages security information and SSIDs of the other Wi-Fi Direct devices included in the group.

Figure 5:
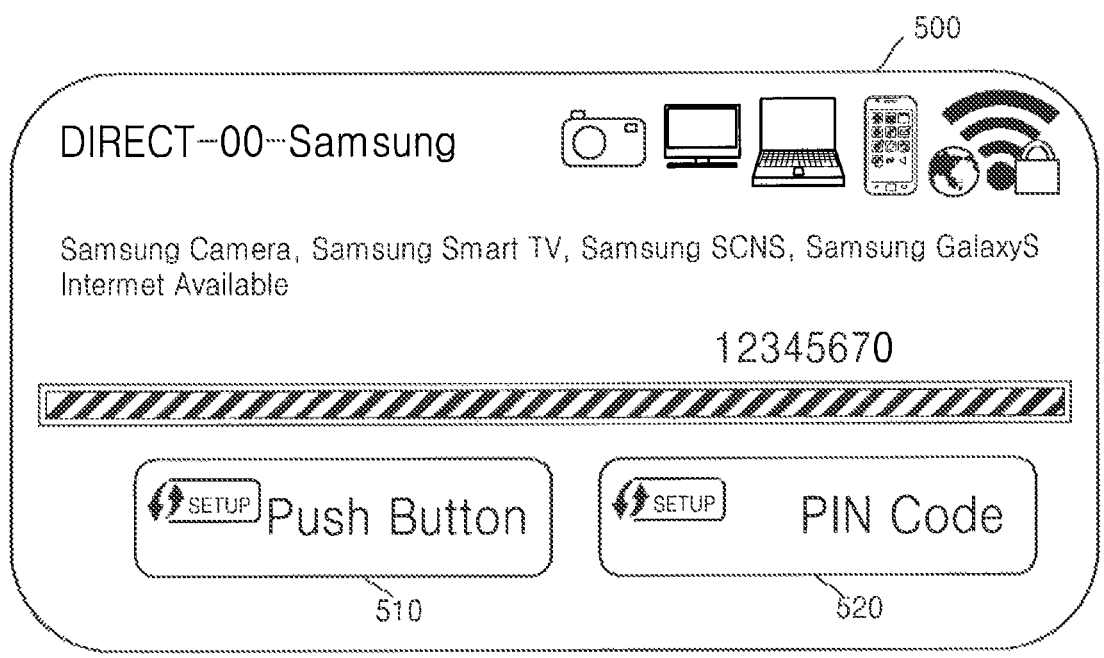
FIG. 5 is a diagram illustrating a display screen for executing a Wi-Fi protected setup (WPS) according to exemplary embodiments of the present general inventive concept.

When the group is formed, the Wi-Fi Direct devices included in the group are securely connected to each other through the WPS. FIG. 5 is a diagram illustrates a display screen 500 for executing the WPS according to exemplary embodiments of the present general inventive concept. The screen of FIG. 5 may be displayed on a display unit of the Wi-Fi Direct MFP (e.g., the Wi-Fi Direct MFP 210 illustrated in FIG. 2, the Wi-Fi Direct MFP 410 illustrated in FIG. 4, etc.). Referring to FIG. 5, the user may select one of a WPS button 510 and a PIN code 520 to execute the WPS. When the WPS is executed through the WPS button 510, the WPS button 510 of the Wi-Fi Direct MFP is pushed (i.e., selected) and WPS buttons of other devices are pushed (i.e. selected) within a predetermined period of time, security information is exchanged between the devices automatically and the secure connection is made. Here, the Wi-Fi Direct device that is the GO provides security information to the Wi-Fi direct devices that are the clients. The secure connection is performed after encrypting in the WPA2-PSK verification method, and thus, increased security may be achieved.

Figure 6:
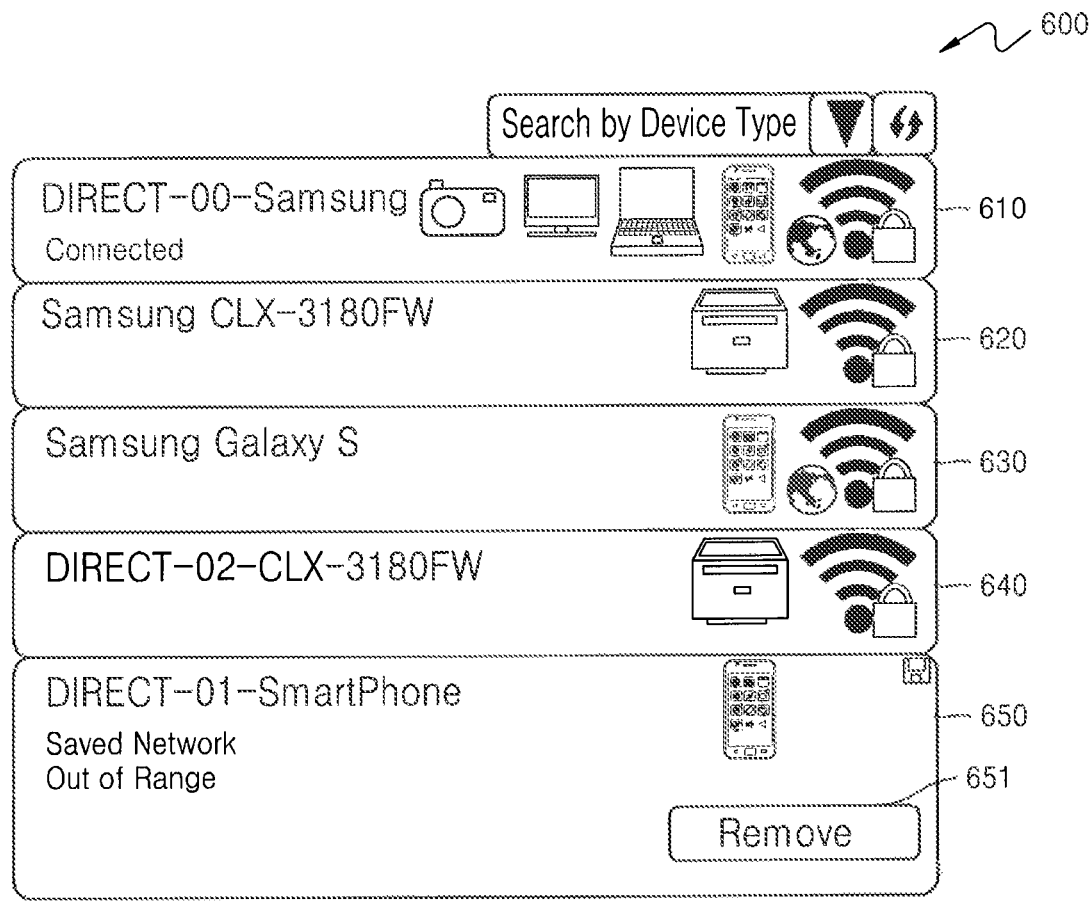
FIG. 6 is a diagram illustrating a list of devices supporting Wi-Fi Direct, information of which is stored according to a profile storing function according to exemplary embodiments of the present general inventive concept.

The Wi-Fi Direct devices have a profile storage function to store information of the Wi-Fi Direct devices connected once thereto. The Wi-Fi Direct devices may include a storage device such a memory, a hard disc drive, a solid state drive, and/or any suitable storage unit to store the profile information of the Wi-Fi Direct devices. FIG. 6 is a diagram illustrating a display screen 600 including a list of the Wi-Fi Direct devices, information of which is stored according to the profile storage function. The list of FIG. 6 is a screen displayed on the display unit of the Wi-Fi Direct MFP (e.g., the Wi-Fi Direct MFP 210 illustrated in FIG. 2, the Wi-Fi Direct MFP 410 illustrated in FIG. 4, etc.). Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing (i.e. selecting) a remove button 651. Since the Wi-Fi direct device has the profile storage function as described above, the Wi-Fi Direct device stores information of the other Wi-Fi Direct devices connected at least once thereto, and then, may be connected fast without executing the WPS by using the stored information in a case where the same device tries to connect thereto again.

Figure 7:
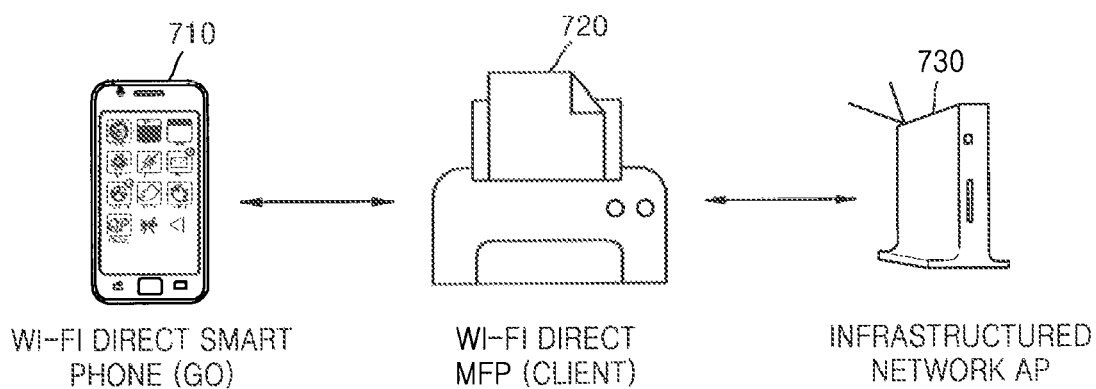
FIG. 7 is a diagram illustrating Wi-Fi Direct supporting devices that are simultaneously connected to each other according to exemplary embodiments of the present general inventive concept.

The Wi-Fi Direct device may be P2P connected to another Wi-Fi direct device, and at the same time, may be connected to the infrastructured network, which is referred to as a concurrent connection. FIG. 7 is a diagram illustrating the Wi-Fi Direct devices that are in the concurrent connection states according to exemplary embodiments of the present general inventive concept. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as illustrated in FIG. 7, or when the Wi-Fi Direct device is wired connected to the infrastructured network and P2P connected to another Wi-Fi direct device, different IP addresses and MAC addresses with respect to the connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
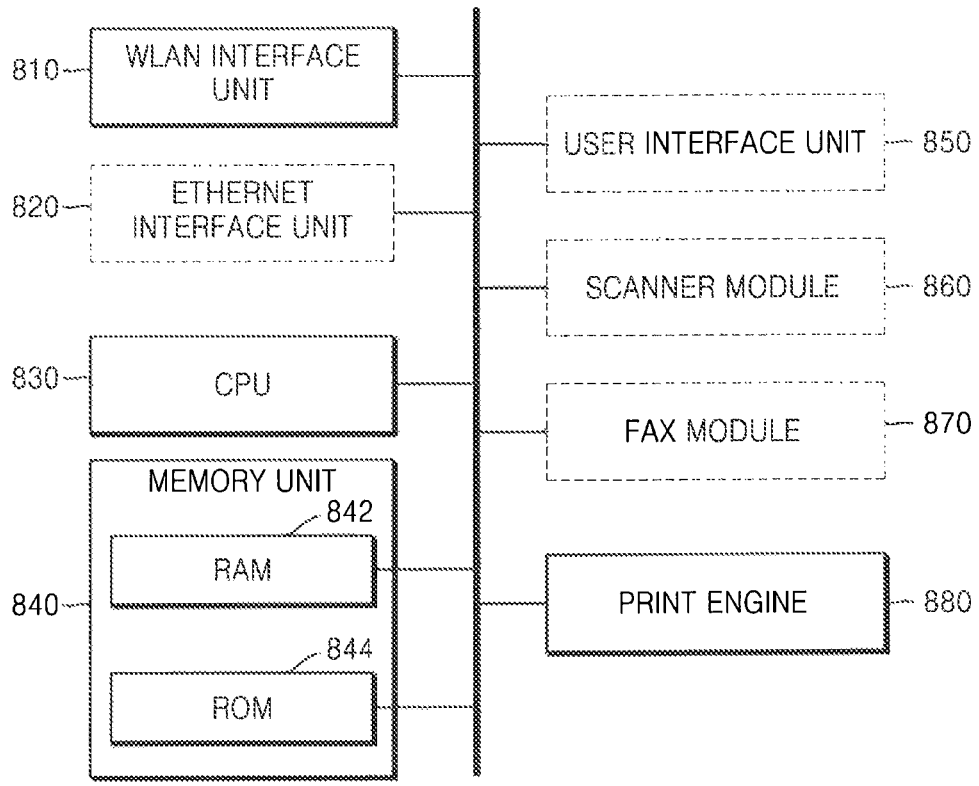
FIG. 8 is a block diagram illustrating a hardware configuration of a multi-function printer to support the Wi-Fi Direct according to exemplary embodiments of the present general inventive concept.

FIG. 8 is a block diagram illustrating a hardware configuration of the Wi-Fi Direct MFP according to exemplary embodiments of the present general inventive concept. Referring to FIG. 8, the Wi-Fi Direct MFP may include a WLAN interface unit 810, an Ethernet interface unit 820, a central processing unit (CPU) 830, a memory unit 840, a user interface unit 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface unit 820. In addition, if the device is a printer, rather than the MFP, the scanner module 860 and the fax module 870 are not necessary.

The WLAN interface module 810 is hardware performing IEEE 802.11 b/g/n function, and may communicate with a main board, on which the CPU 830 is mounted, of the MFP via a universal serial bus (USB). The CPU 830 may be, for example, a processor, a controller, a programmable logic device, a field programmable gate array, and/or any other suitable processor to carry out the exemplary embodiments of the present general inventive concept. The Ethernet interface unit 820 is hardware for performing wired Ethernet communication according to IEEE 802.3. The CPU 830 controls overall operations of the MFP, and the memory unit 840 stores information for controlling the MFP and the print data to be read when it is necessary. The memory unit 840 may be a volatile memory device, a non-volatile memory device, a hard disc drive, a solid state drive, and/or any suitable memory device. The user interface unit 850 may receive input from the user to identify information of the MFP and to input commands into the MFP. The user interface unit 850 may be variously modified according to products, for example, may be configured as two or four lines displayed on a display unit such as an LCD or a light emitting diode (LED), or may be realized as a graphic user interface (UI) so as to represent various graphics. The scanner module 860, the fax module 870, and the print engine 880 are hardware for performing functions of a scanner, a facsimile, and a printer. That is, the scanner module 860 may scan one or more documents to form one or more images, the fax module 870 may transmit or receive fax data, and the print engine 880 may print data from the scanner module 860, the fax module 870, the memory unit 840, or that is received from the WLAN interface unit 810 or the Ethernet interface unit 820.

Figure 9:
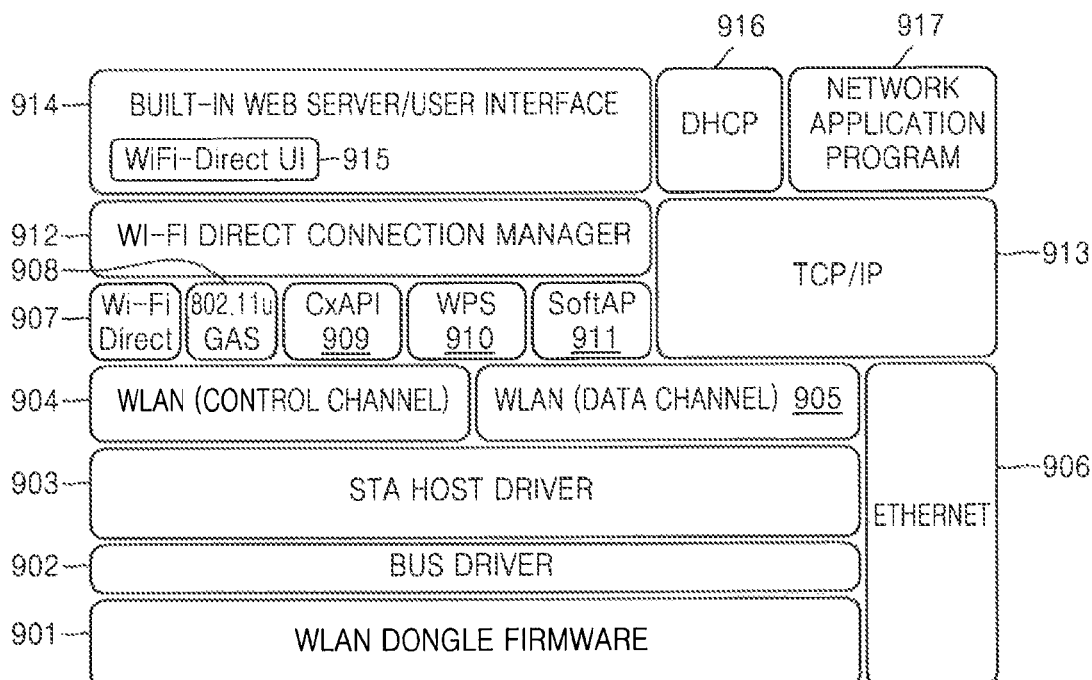
FIG. 9 is a block diagram illustrating a software configuration of the multi-function printer to support the Wi-Fi Direct of FIG. 8 according to exemplary embodiments of the present general inventive concept.

FIG. 9 is a block diagram illustrating software configuration of the Wi-Fi Direct MFP according to exemplary embodiments of the present general inventive concept. The configuration of the software in the Wi-Fi Direct MFP will be described with reference to FIG. 9 as follows.

A WLAN dongle firmware 901 is a firmware to connect the WLAN, and may be stored in WLAN dongle hardware or may be transmitted to the WLAN dongle hardware from a main board of the MFP when booting the MFP (e.g., the Wi-Fi Direct MFP 210, the Wi-Fi Direct MFP 410, etc.). A bus driver 902 and a STA (station) host driver 903 are low level bus drivers to communicate with the WLAN hardware. A WLAN controlling channel 904 and a WLAN data channel 905 are channels to communicate with the WLAN firmware. Ethernet 906 is a networking standard for the communication of data. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, a CxAPI 909 is an application program interface for digital transmission of data and other network services over the traditional circuits of the public switched telephone network, and a WPS module 910 performs a WPS function. A soft AP module 911 is a software module allowing the MFP to perform as the AP. A transmission control protocol (TCP)/IP 913 is a standard protocol for network transmission. A Wi-Fi Direct connection manager 912 is a module for controlling the Wi-Fi Direct connection. A Wi-Fi Direct user interface 915 allows the user to perform settings related to the Wi-Fi Direct, and may be included in a user interface 914 that is installed in an embedded web server (EWS). A DHCP (dynamic host configuration protocol) server 916 automatically allocates an IP to the Wi-Fi Direct device that is connected as a client. A network application program 917 performs various application operations relating to the network.

The above-described Wi-Fi Direct technology has the following features and utilities, as discussed below.

A Wi-Fi Direct device may be connected to other devices whenever and wherever, and thus, the Wi-Fi Direct device has maximum mobility and portability. If a new Wi-Fi Direct device is added, the Wi-Fi Direct device may be directly connected to the new Wi-Fi direct device. It may be identified whether there is an available device or service before setting the connection to other devices, and thus, the Wi-Fi direct devices may be conveniently used. The connection may be performed by an operation such as, for example, pushing a WPS button, and the connection may be performed with increased secure functions by using WPA2.

The Wi-Fi Direct technology may provide one or more functions that may not be provided by the conventional WLAN technology.

For example, the device discovery function to search for peripheral Wi-Fi Direct devices by a device type unit, the service discovery function that may search for services provided by the peripheral Wi-Fi Direct devices, a power management function that may effectively and/or efficiently use electric power, the concurrent connection function that may form the P2P connection between the Wi-Fi Direct devices while connecting to a conventional infrastructure network, a function of separating a security domain between the infrastructured network connection and the Wi-Fi Direct connection, and a cross connection function for sharing an Internet connection may be provided by the Wi-Fi Direct technology.

The Wi-Fi Direct devices of the exemplary embodiments of the present general inventive may be compatible with conventional legacy WLAN devices.

Hereinafter, a method of activating Wi-Fi Direct, a method of performing image forming operations, a method of managing channels, and a method of changing a WLAN mode in an MFP supporting Wi-Fi Direct according to exemplary embodiments of the present general inventive concept will be described in detail with reference to the accompanying drawings.

As illustrated in the description with reference to FIG. 7, the MFP supporting Wi-Fi Direct supports the concurrent connection function, that is, may be connected to the infrastructured network and P2P connected to a wireless terminal supporting Wi-Fi Direct (e.g., smartphone 710). The concurrent connection function provides utility in a situation where the MFP is connected to an AP of the infrastructured network, and, at the same time, a print operation has to be performed by using wireless devices that are not connected to the AP. Conventionally, the wireless devices that are not connected to the AP may be connected to the MFP by using an ad-hoc function in order to use a wireless printing service; however, if one MFP is connected to the infrastructured network, the MFP may not simultaneously use the ad-hoc function.

Detailed operation methods of performing image forming operations, such as a printing or scanning operation, by using the wireless devices that are P2P connected to the MFP via Wi-Fi Direct when the MFP uses the concurrent connection function, managing channels used to connect to the infrastructured network and to connect the Wi-Fi Direct, and changing an operation mode between the Wi-Fi Direct mode and the ad-hoc operation mode are to be provided.

A method of activating Wi-Fi Direct so that the MFP supporting Wi-Fi Direct functions as an AGO will be described below.

Figure 10:
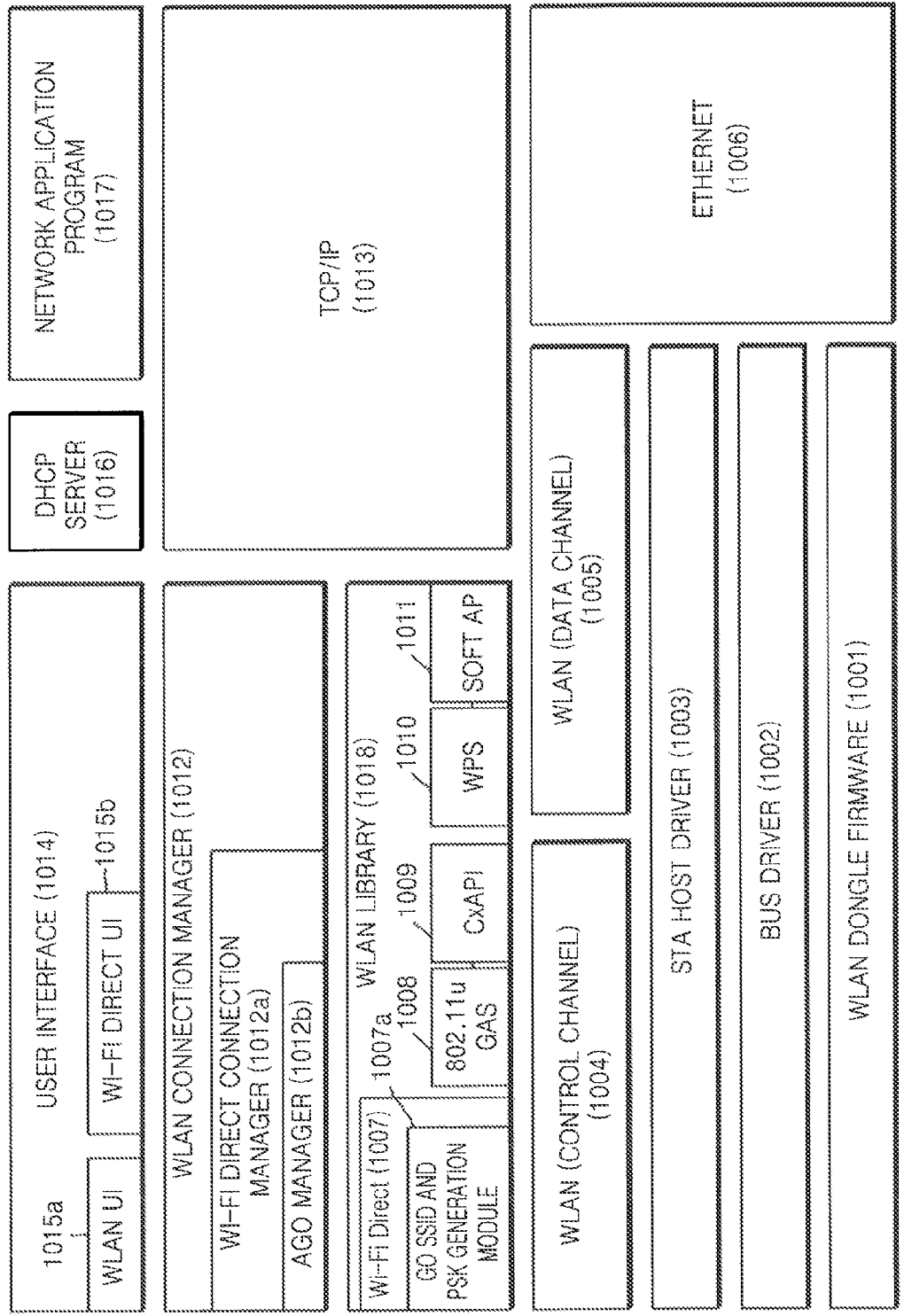
FIG. 10 is a detailed block diagram illustrating a software configuration of a multi-function printer to support the Wi-Fi Direct according to exemplary embodiments of the present general inventive concept.

FIG. 10 is a block diagram illustrating a software configuration of an MFP supporting Wi-Fi Direct according to exemplary embodiments of the present general inventive concept. A WLAN dongle firmware 1001 is a firmware to connect the WLAN, and may be stored in WLAN dongle hardware or may be transmitted to the WLAN dongle hardware from a main board of the MFP when booting the MFP. A bus driver 1002 and a STA (station) host driver 1003 are low level bus drivers for communicating with the WLAN hardware. A WLAN controlling channel 1004 and a WLAN data channel 1005 are channels to communicate with the WLAN firmware. Ethernet 1006 is a networking standard for the communication of data. A Wi-Fi Direct module 1007 performs the Wi-Fi Direct connection and transmits an operating command to the WLAN firmware. An IEEE 802.11u generic advertisement service (GAS) module 1008 performs functions according to IEEE 802.11u GAS, a CxAPI 1009 is an application program interface for digital transmission of data and other network services over the traditional circuits of the public switched telephone network, and a WPS module 1010 performs a WPS function. A soft AP module 1011 is a software module allowing the MFP to perform as the AP. A transmission control protocol (TCP)/IP 1013 is a standard protocol for network transmission. A Wi-Fi Direct connection manager 1012 is a module to control the Wi-Fi Direct connection. A user interface 1014 may be installed in an embedded web server (EWS), and can include a WLAN user interface (UI) 1015a which my allow a user to control settings related to the WLAN, and a Wi-Fi Direct UI 1015b which may allow a user to control settings related to the Wi-Fi Direct. A DHCP server 1016 automatically allocates an IP to the Wi-Fi Direct device that is connected as a client. A network application program 1017 performs various application operations relating to the network.

The software configuration of an MFP supporting Wi-Fi Direct of the exemplary embodiments illustrated in FIG. 10 may include an AGO 1012b included in a Wi-Fi Direct connection manager 1012a so as to have the MFP supporting Wi-Fi Direct perform as an AGO. A GO SSID and PSK generation module 1007a included in a Wi-Fi Direct library 1007 can generate an SSID and a PSK that may be used when the MFP functions as the AGO.

Figure 11:
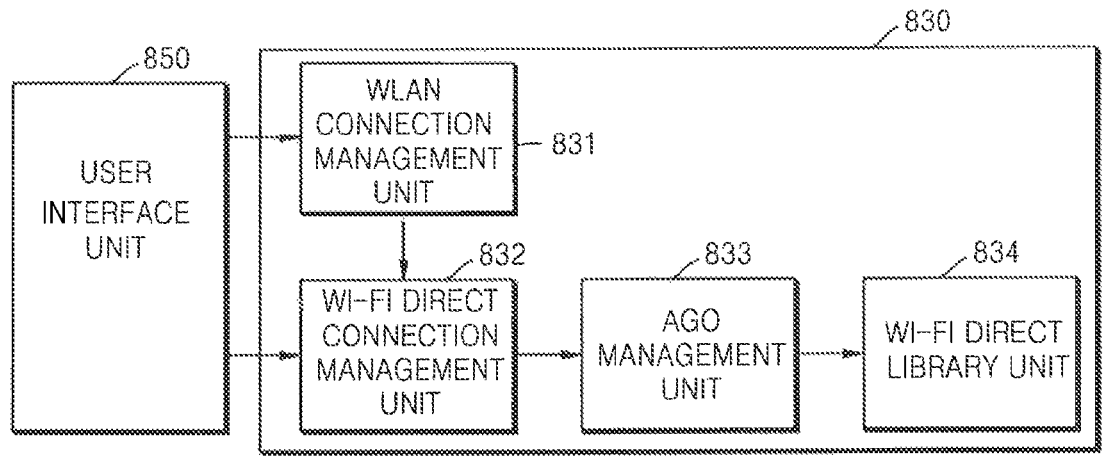
FIG. 11 is a detailed block diagram of the multi-function printer to support the Wi-Fi direct according to exemplary embodiments of the present general inventive concept.

FIG. 11 is a detailed block diagram illustrating an MFP to support Wi-Fi Direct according to exemplary embodiments of the present general inventive concept. Referring to FIG. 11 illustrating the exemplary structure of the MFP supporting Wi-Fi Direct, the CPU 830 includes a WLAN connection management unit 831, a Wi-Fi Direct connection management unit 832, an AGO management unit 833, and a Wi-Fi Direct library unit 834. The Wi-Fi Direct connection management unit 832 receives a Wi-Fi Direct initialization command from the WLAN connection management unit 831 from a user via the user interface unit 850, and then, the Wi-Fi Direct connection management unit 832 turns a GO flag on. The AGO management unit 833 identifies the GO flag, and when the GO flag is in a turned on state, the AGO management unit 833 activates Wi-Fi Direct so that the MFP performs as a GO. The Wi-Fi Direct library unit 834 generates an SSID and a PSK of the GO according to a command of the AGO management unit 833.

Figure 12:
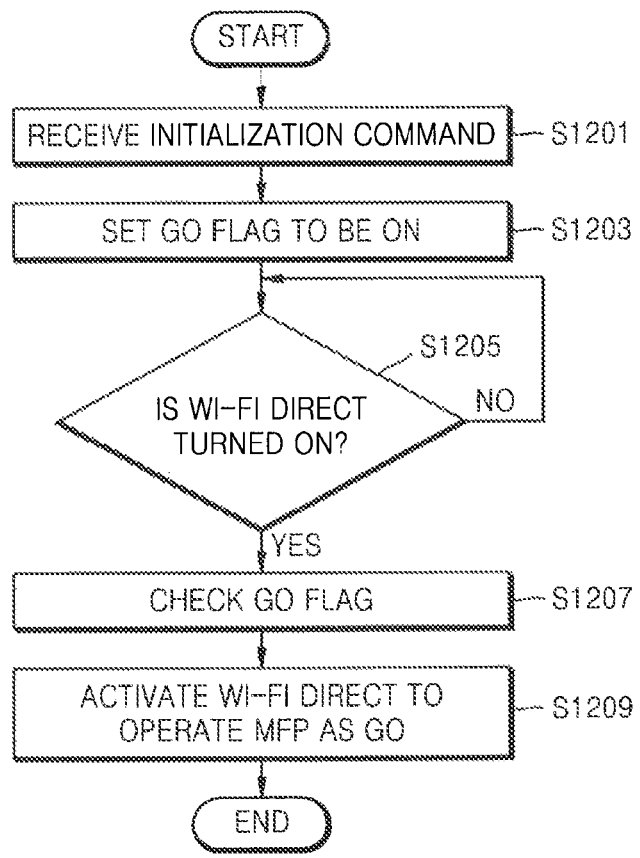
FIGS. 12, 13A, and 13B are flowcharts illustrating a method of activating Wi-Fi Direct in a multi-function printer supporting Wi-Fi Direct, according to exemplary embodiments of the present general inventive concept.

FIGS. 12 and 13 are flowcharts illustrating a method of activating Wi-Fi Direct in an MFP supporting Wi-Fi Direct, according to exemplary embodiments of the present general inventive concept. Hereinafter, the method of activating Wi-Fi Direct will be described in detail with reference to FIGS. 11 through 13.

Referring to FIG. 12, an initialization command is received at operation S1201. The initialization command is a Wi-Fi Direct initialization command, and may be an MFP initialization command that is accompanied with the initialization of Wi-Fi Direct. The initialization command may be directly input by the user via the user interface unit 850, or may be transmitted from the WLAN connection management unit 831. When the initialization command is received, the Wi-Fi Direct connection management unit 832 turns the GO flag on at operation S1203. The GO flag is an index representing whether Wi-Fi Direct is activated so that the MFP becomes the GO. When the GO flag is in a turned on state, the MFP (e.g., the MFP 110 of FIG. 1, the Wi-Fi Direct MFP of FIG. 2, the Wi-Fi Direct MFP 410 of FIG. 4, etc.) functions as the GO, and when the GO flag is in a turned off state, the MFP does not function as the GO. In the present exemplary embodiment, the GO flag is automatically turned on when the initialization command is received, and thus, the MFP may perform as the AGO without connecting to the other Wi-Fi Direct devices. It is determined whether Wi-Fi Direct is turned on at operation S1205. If Wi-Fi Direct is turned on, the process goes to operation S1207 in which the AGO manager 833 identifies the GO flag. If the GO flag is in a turned on state, the process goes to operation S1209 in which Wi-Fi Direct is activated so that the MFP becomes the GO. However, when determining whether Wi-Fi Direct is in a turned on state in operation S1205, the turned on state of Wi-Fi Direct denotes that the MFP is set to use the Wi-Fi Direct function.

Figure 13A:
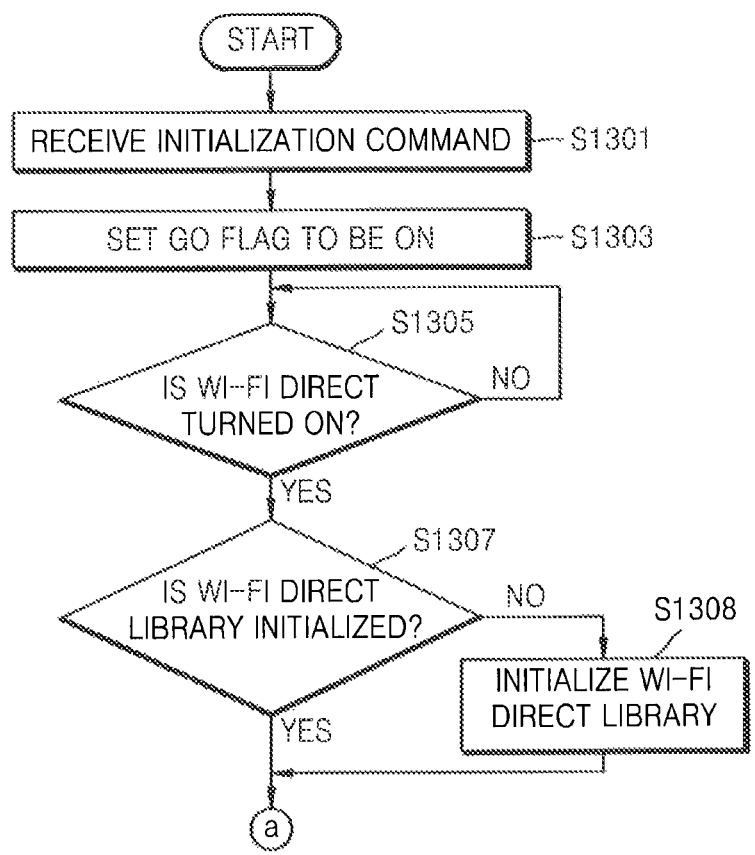
Figure 13B:
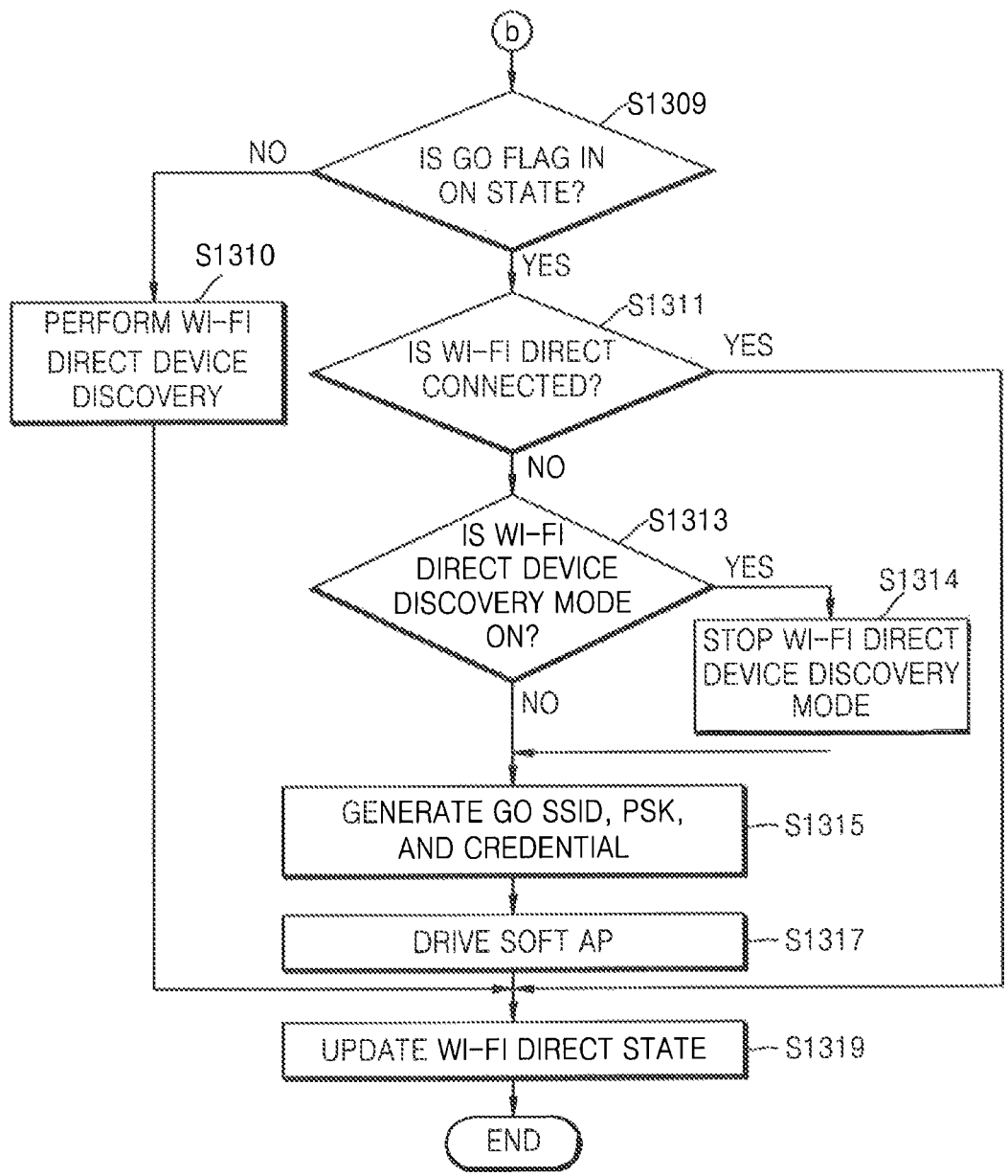

Referring to FIGS. 13A and 13B, when an initialization command at operation S1301 is received, the GO flag is turned on at operation S1303, and it is determined whether Wi-Fi Direct is in a turned on state at operation S1305. The above processes are the same as the operations S1201, S1203, and S1205 described with reference to FIG. 12. When it is determined that Wi-Fi Direct is in a turned on state in operation S1305, the Wi-Fi Direct connection manager 832 determines whether the Wi-Fi Direct library is initialized at operation S1307. If it is determined that the Wi-Fi Direct library is initialized, operation S1309 is performed, in which the AGO manager 833 determines whether the GO flag is in a turned on state. Otherwise, if it is determined that the Wi-Fi Direct library is not initialized, the Wi-Fi Direct library is initialized in operation S1308, and then, the operation S1309 is performed. If the GO flag is determined to be in the turned on state in operation S1309, it is determined whether Wi-Fi Direct is connected at operation S1311. Otherwise, if the GO flag is in the turned off state, a Wi-Fi Direct device discovery process is performed at operation S1310, and then, operation S1319 is performed to update the state of Wi-Fi Direct. If it is determined that Wi-Fi Direct is connected in operation S1311, the Wi-Fi Direct state is also updated in operation S1319. Otherwise, if it is determined that Wi-Fi Direct is not connected in operation S1311, it is determined whether the Wi-Fi Direct device discovery mode is operating at operation S1313. If the device discovery mode is not operating, operation S1315 is performed to generate the SSID, PSK, and GO credential; however, if the device discovery mode is operating, the Wi-Fi Direct device discovery mode is terminated at operation S1314, and the operation S1315 is performed. An SSID, a PSK, and a GO credential are generated for when the MFP operates as the GO at operation S1315, and then, a soft AP is driven to activate Wi-Fi Direct so that the MFP operates as the GO at operation S1317, and the Wi-Fi Direct state is updated at operation S1319.

As described above, when activating Wi-Fi Direct according to the Wi-Fi Direct initialization command, the MFP may operates as the AGO even when the MFP is not connected to other Wi-Fi Direct devices, and thus, the Wi-Fi Direct network is formed in advance to be connected to legacy wireless devices that do not support Wi-Fi Direct. The MFP may perform as a GO having increased power consumption due to an advantage that the MFP may consume a lot of electric power as a fixed device. Anan IP address of the MFP may be fixed.

Figure 14:
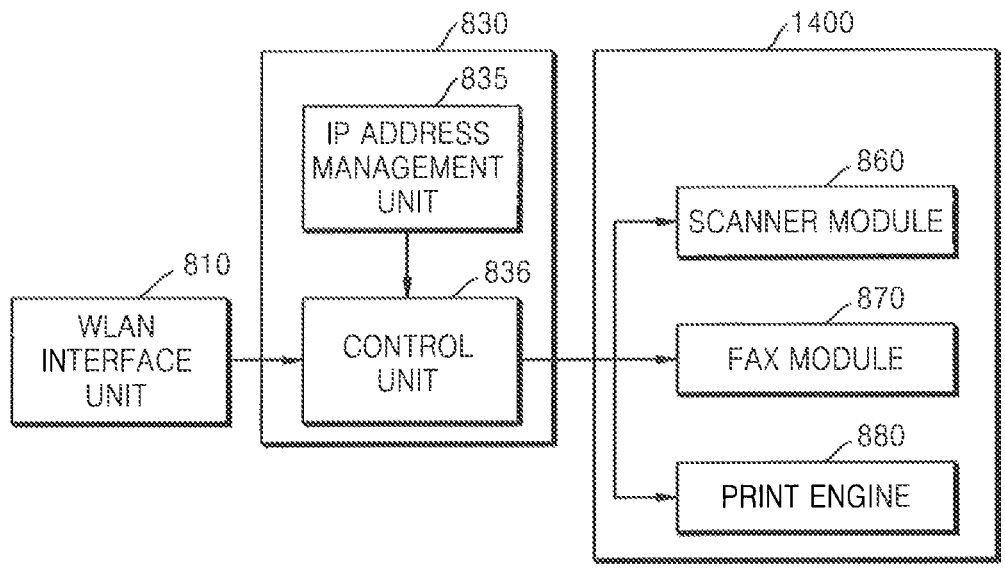
FIG. 14 is a detailed block diagram of a multi-function printer supporting Wi-Fi Direct according to exemplary embodiments of the present general inventive concept.

Hereinafter, a method of performing image forming processes in an MFP supporting Wi-Fi Direct according to exemplary embodiments of the present general inventive concept will be described with reference to the accompanying drawings. FIG. 14 is a detailed block diagram illustrating an MFP supporting Wi-Fi Direct according to exemplary embodiments of the present general inventive concept. Referring to FIG. 8, illustrating a structure of the MFP supporting Wi-Fi direct, the CPU 830 illustrated in FIG. 14 may include an IP address management unit 835 and a control unit 836. The scanner module 860, the fax module 870, and the print engine 880 are included in an image forming unit 1400.

The WLAN interface unit 810 allows the MFP to be Wi-Fi Direct connected at the same time of being connected to the infrastructured network. The IP address management unit 835 manages an IP address of the infrastructured network and an IP address of the Wi-Fi Direct interface. The MFP supports the concurrent connection function as described above, and has two different IP addresses according to the interfaces in the case where the MFP is connected to both of the infrastructured network and the Wi-Fi Direct. The IP address management unit 835 identifies the IP address of each interface and provides the control unit 836 with the IP address. The control unit 836 receives the IP addresses from the IP address management unit 835 and controls execution of the image forming operation requested by an external wireless device (e.g., the smartphone 120, the laptop computer 130, and/or the legacy WLAN laptop computer 140 illustrated in FIG. 1; or the smartphone 710 illustrated in FIG. 7, etc.).

In more detail, when the control unit 836 receives a discovery packet from the wireless terminal Wi-Fi Direct connected to the MFP through the Wi-Fi Direct interface, the control unit 836 receives the IP address of the Wi-Fi Direct interface from the IP address management unit 835 to generate a response packet including the IP address and transmit the response packet to the wireless terminal (e.g., an external wireless device such as the smartphone 120, the laptop computer 130, and/or the legacy WLAN laptop computer 140 illustrated in FIG. 1; or the smartphone 710 illustrated in FIG. 7, etc.). The wireless terminal analyzes the response packet transmitted from the MFP to get the IP address of the Wi-Fi Direct interface of the MFP. The control unit 836 may generate the response packet further including services available by the MFP, and in this case, the wireless terminal may determine the services that may be provided by the MFP by analyzing the response packet.

If the control unit 836 receives a request to perform an image forming operation, the destination of which is the IP address of the Wi-Fi Direct interface, from the wireless terminal (e.g., an external wireless device such as the smartphone 120, the laptop computer 130, and/or the legacy WLAN laptop computer 140 illustrated in FIG. 1; or the smartphone 710 illustrated in FIG. 7, etc.) Wi-Fi Direct connected to the MFP, the control unit 836 may allow the image forming unit 1400 to perform the requested image forming operation. For example, if the control unit 836 receives print data, the destination of which is the IP address of the Wi-Fi Direct interface, from the wireless terminal, the control unit 836 allows the print engine 880 to perform the print operation according to the received print data. When the control unit 836 receives a scan request, the destination of which is the IP address of the Wi-Fi Direct interface, from the wireless terminal, and the controller 836 allows the scanner module 860 to perform the scanning operation. When the controller 836 receives a fax request, data may be transmitted via the fax module 870 to a destination which may be determined from the IP address of the Wi-Fi Direct interface, or where a fax number for the destination is provided to the CPU 830 or to the image forming unit 1400 (e.g., via a user interface of the image forming unit 1400).

Figure 15:
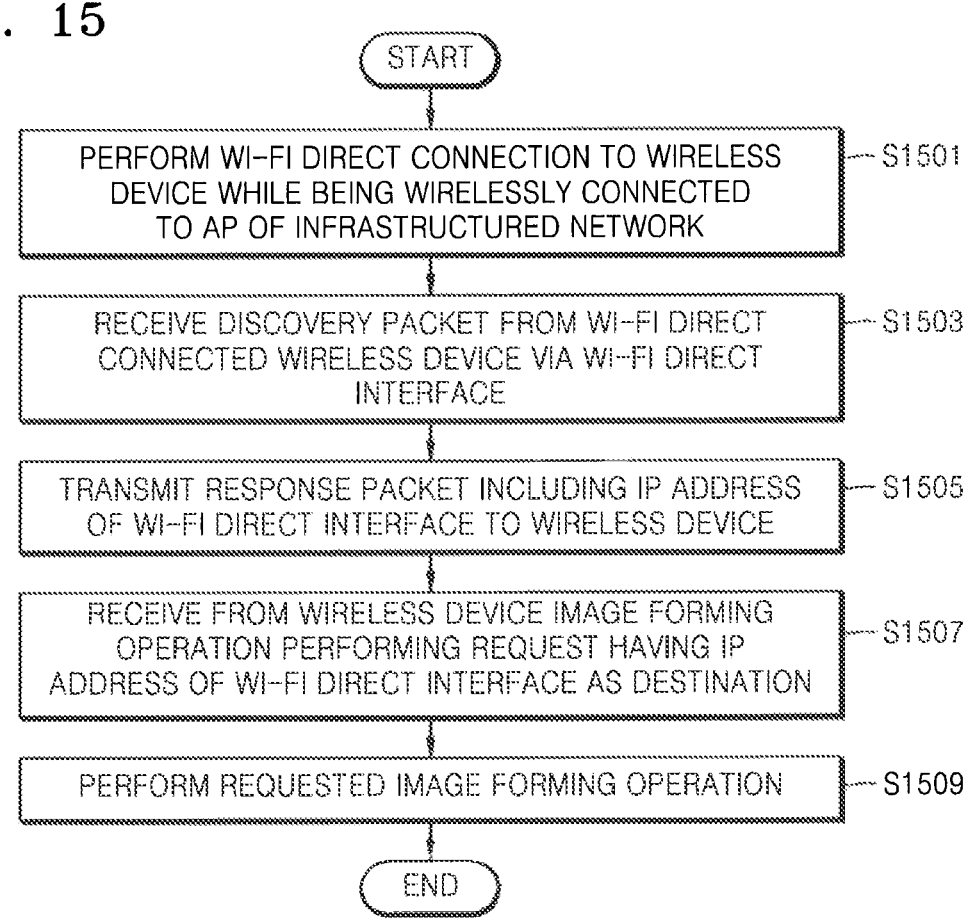
FIG. 15 is a flowchart illustrating a method of performing image forming processes in the multi-function printer supporting Wi-Fi Direct, according to exemplary embodiments of the present general inventive concept.

FIG. 15 is a flowchart illustrating a method of performing an image forming operation of the MFP supporting Wi-Fi Direct, according to exemplary embodiments of the present general inventive concept. Referring to FIG. 15, the MFP is Wi-Fi Direct connected to the wireless terminal (e.g., an external wireless device such as the smartphone 120, the laptop computer 130, and/or the legacy WLAN laptop computer 140 illustrated in FIG. 1; or the smartphone 710 illustrated in FIG. 7, etc.) in a state of being connected to the AP of the infrastructured network by using the concurrent connection function at operation S1501. The MFP receives a discovery packet from the wireless terminal that is Wi-Fi Direct connected to the MFP via the Wi-Fi Direct interface at operation S1503. When the discovery packet from the wireless terminal is received via the Wi-Fi Direct interface, the MFP generates a response packet including an IP address of the Wi-Fi Direct interface and transmits the response packet to the wireless terminal at operation S1505. The wireless terminal receiving the response packet may identify the IP address of the Wi-Fi Direct interface of the MFP by analyzing the response packet. Further, the MFP may generate a response packet including information about available services of the MFP, and in this case, the wireless terminal may identify the kinds of image forming operation services provided by the MFP by analyzing the response packet. The image forming operation services may include, for example, printing operations, scanning operations, and faxing operations. When the wireless terminal receiving the response packet transmits a request for executing the image forming operation to a destination of the IP address of the Wi-Fi Direct interface, the MFP receives the response packet at operation S1507, and performs the requested image forming operation at operation S1509. For example, when print data, the destination of which is the IP address of the Wi-Fi Direct interface, is received in operation S1507, the printing is performed according to the print data at operation S1509, and if a scanning request, the destination of which is the IP address of the Wi-Fi Direct interface, is received in operation S1507, the scanning operation is performed at operation S1509. When data to be faxed is received at operation S1507, the destination of which is determined from the IP address of the Wi-Fi Direct interface, a faxing operation is perform at operation S1509.

As described above, the response packet, including the IP address of the Wi-Fi Direct interface, is transmitted to the wireless terminal that is Wi-Fi Direct connected to the MFP, and when the MFP receives the request to perform the image forming operation (e.g., a printing operation, a scanning operation, a faxing operation, etc.), the destination of which is the IP address of the Wi-Fi Direct interface, from the wireless terminal, the MFP performs the request. Thus, the MFP may perform the image forming operation requested by the wireless terminal that is Wi-Fi Direct connected to the MFP in a state of being connected to the infrastructured network and the Wi-Fi Direct simultaneously.

Figure 16:
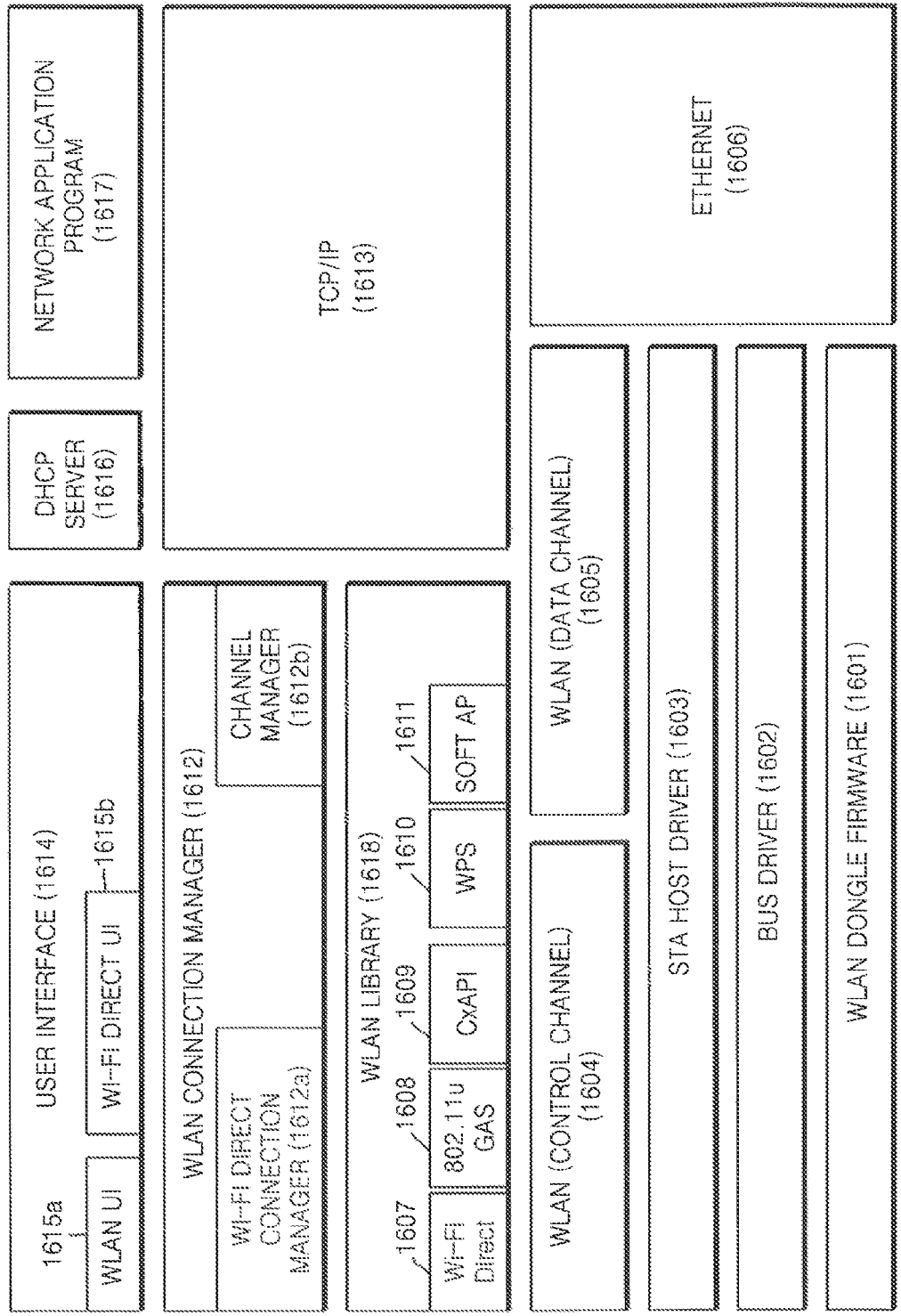
FIG. 16 is a block diagram illustrating a software configuration of a multi-function printer to support the Wi-Fi Direct according to exemplary embodiments of the present general inventive concept.

Hereinafter, a method of managing channels in the MFP supporting Wi-Fi Direct according to exemplary embodiments of the present general inventive concept will be described in detail with reference to the accompanying drawings. FIG. 16 is a block diagram illustrating a software configuration of the MFP to support Wi-Fi Direct according to exemplary embodiments of the present general inventive concept.

As illustrated in FIG. 16, a WLAN dongle firmware 1601 is a firmware to connect the WLAN, and may be stored in WLAN dongle hardware or may be transmitted to the WLAN dongle hardware from a main board of the MFP when booting the MFP. A bus driver 1602 and a STA (station) host driver 1603 are low level bus drivers for communicating with the WLAN hardware. A WLAN controlling channel 1604 and a WLAN data channel 1605 are channels to communicate with the WLAN firmware. Ethernet 1606 is a networking standard for the communication of data. A Wi-Fi Direct module 1607 performs the Wi-Fi Direct connection and transmits an operating command to the WLAN firmware. An IEEE 802.11u generic advertisement service (GAS) module 1608 performs functions according to IEEE 802.11u GAS, a CxAPI 1609 is an application program interface for digital transmission of data and other network services over the traditional circuits of the public switched telephone network, and a WPS module 1610 performs a WPS function. A soft AP module 1611 is a software module allowing the MFP to perform as the AP. A transmission control protocol (TCP)/IP 1613 is a standard protocol for network transmission. A WLAN connection manager 1612 is a module for controlling the Wi-Fi Direct connection. A user interface 1614 may be installed in an embedded web server (EWS), and can include a WLAN user interface (UI) 1615a which my allow a user to control settings related to the WLAN, and a Wi-Fi Direct UI 1615b which may allow a user to control settings related to the Wi-Fi Direct. A DHCP (dynamic host configuration protocol) server 1616 automatically allocates an IP to the Wi-Fi Direct device that is connected as a client. A network application program 1617 performs various application operations relating to the network.

Featured components of the software configuration of the MFP to support Wi-Fi Direct according illustrated in FIG. 16 include a channel manager 1612b included in a WLAN connection manager 1612 to manage a channel used by the MFP to connect to the infrastructured network AP and a Wi-Fi Direct operation channel used in the Wi-Fi Direct connection. The method of managing the channels used in the connections by the channel manager 1612b will be described below with reference to FIGS. 18 through 24.

Figure 17:
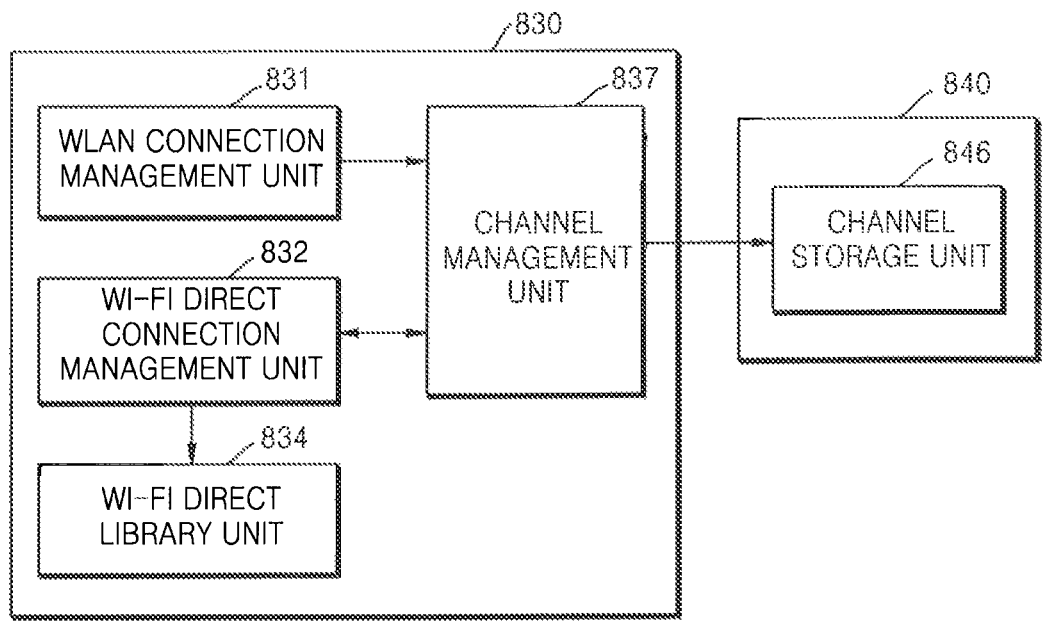
FIG. 17 is a detailed block diagram illustrating a multi-function printer to support Wi-Fi Direct according to exemplary embodiments of the present general inventive concept.

FIG. 17 illustrates a block diagram of the MFP supporting Wi-Fi Direct according to exemplary embodiments of the present general inventive concept. Referring back to FIG. 8 showing the configuration of the MFP supporting Wi-Fi Direct, the CPU 830 of FIG. 17 may include the WLAN connection management unit 831, the Wi-Fi Direct connection management unit 832, the Wi-Fi Direct library unit 834, and a channel management unit 837. The memory 840 may include a channel storage unit 846 therein.

The channel management unit 837 identifies the channel used by the MFP to connect to the infrastructured network AP from the WLAN connection management unit 831, and identifies the Wi-Fi Direct operation channel used in the Wi-Fi Direct connection from the Wi-Fi Direct connection management unit 832. The channel management unit 837 makes the channel used in the AP connection and the Wi-Fi Direct operation channel coincide with each other. The channel management unit 837 stores the channel used in the connection to the infrastructured network AP in the channel storage unit 846 so that the stored channel may be set as the Wi-Fi Direct operation channel when the connection to the infrastructured network AP is disconnected and Wi-Fi Direct is activated. Since the MFP can be used as a fixed device, it is likely to use the channel that has been used to connect to the infrastructured network AP once again. When the Wi-Fi Direct operation channel is set to be the same as the channel used to connect to the AP by the channel manager 837, the Wi-Fi Direct connection management unit 832 activates Wi-Fi Direct through the set Wi-Fi Direct operation channel by using the Wi-Fi Direct library unit 834.

FIGS. 18 through 23 are flowcharts illustrating the method of managing the channels in the MFP supporting Wi-Fi Direct according to exemplary embodiments of the present general inventive concept. Hereinafter, the channel managing method will be described in detail below with reference to FIGS. 18 through 23.

Figure 18:
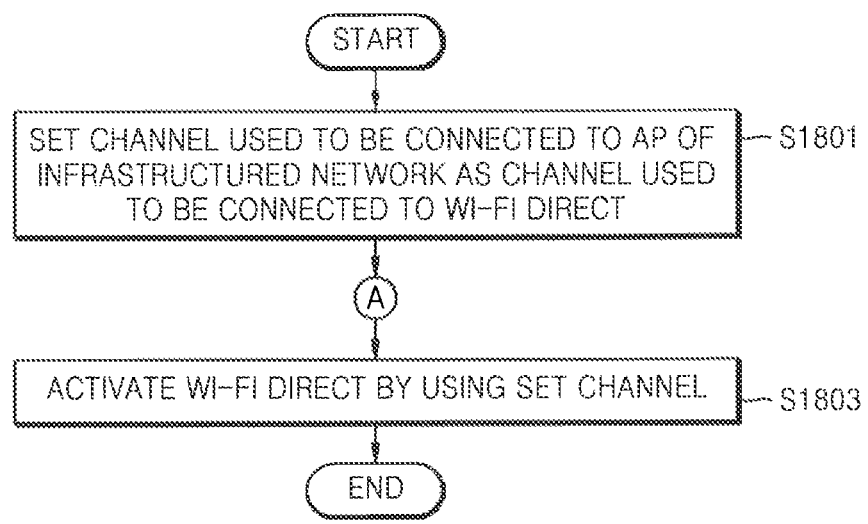
FIGS. 18 through 23 are flowcharts illustrating a method of managing channels in a multi-function printer supporting Wi-Fi Direct, according to exemplary embodiments of the present general inventive concept.
Figure 19:
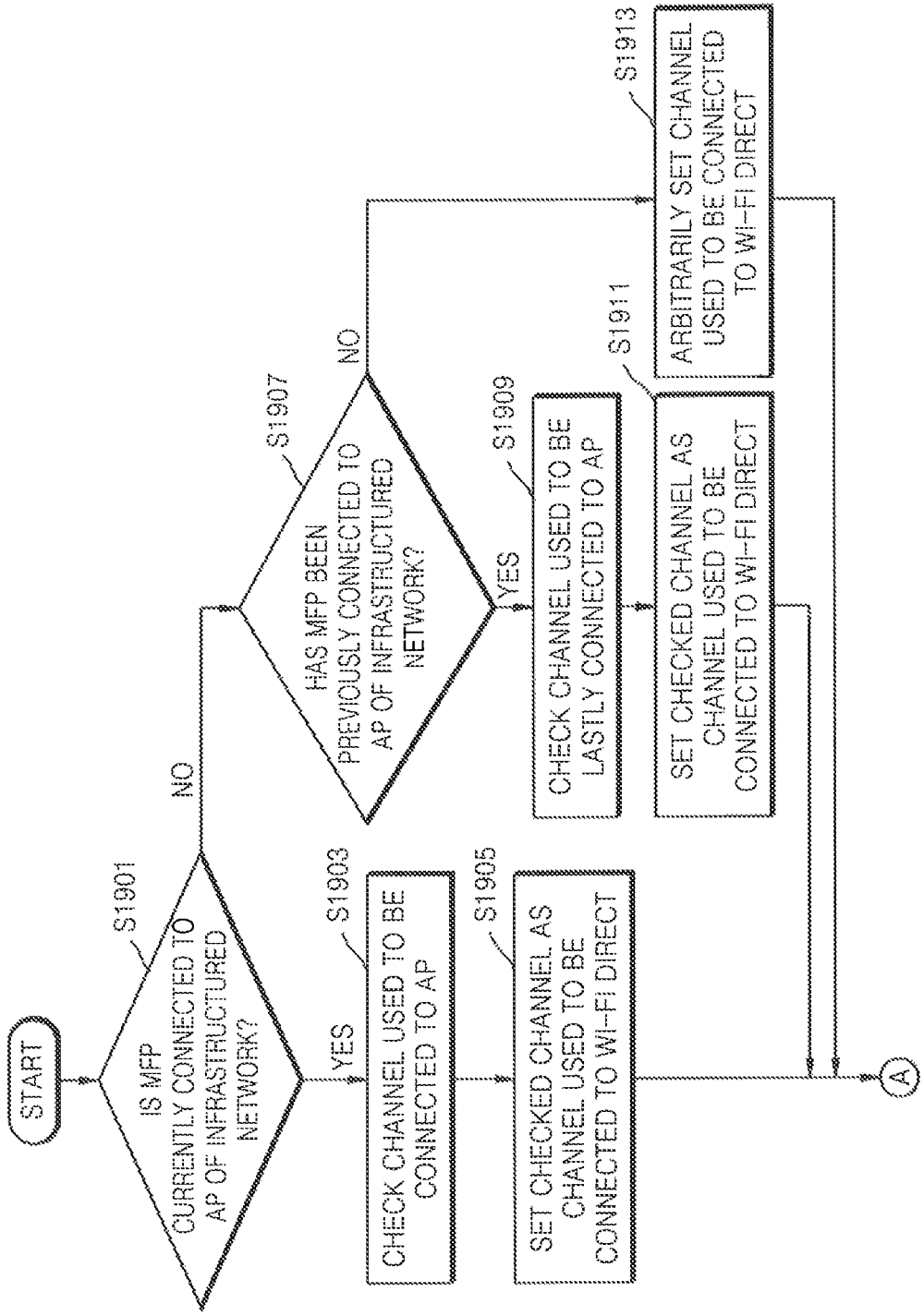

Referring to FIG. 18, the channel that has been used to connect the MFP to the infrastructured network AP is set as the Wi-Fi Direct operation channel at operation S1801, and Wi-Fi Direct is activated by using the set channel at operation S1803. Here, sub-processes of operation S1801 to set the channel used in the connection to the AP as the Wi-Fi Direct operation channel are illustrated in FIG. 19. Referring to FIG. 19, before activating Wi-Fi Direct, it is determined whether the MFP is connected currently to the infrastructured network AP at operation S1901. As a result of determination, if the MFP is currently connected to the infrastructured network AP, the channel used in the connection to the AP is identified at operation S1903. The identified channel is set as the Wi-Fi Direct operation channel at operation S1905). However, as a result of the determination in operation S1901, if the MFP is not currently connected to the infrastructured network AP, it is determined whether the MFP has ever been connected to the infrastructured network AP at operation S1907. If the MFP has been connected to the infrastructured network AP, the channel used in the last connection to the AP is identified at operation S1909, and the identified channel is set as the Wi-Fi Direct operation channel operation S1911. If the MFP has never been connected to the infrastructured network AP before in operation S1907, an arbitrary channel is set as the Wi-Fi Direct operation channel at operation S1913.

Figure 20:
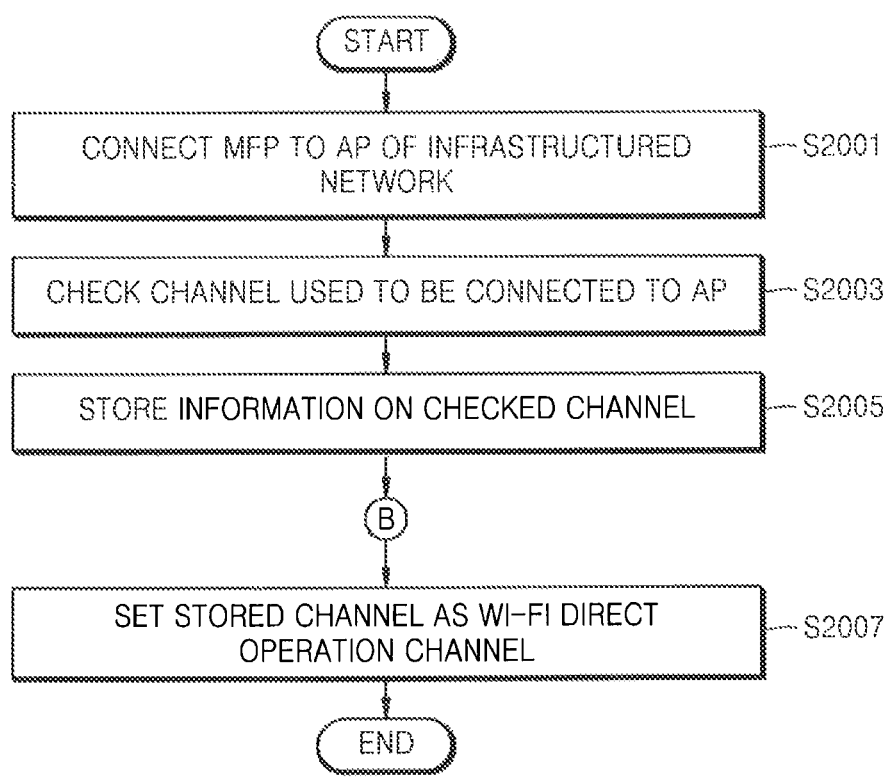
Figure 21:
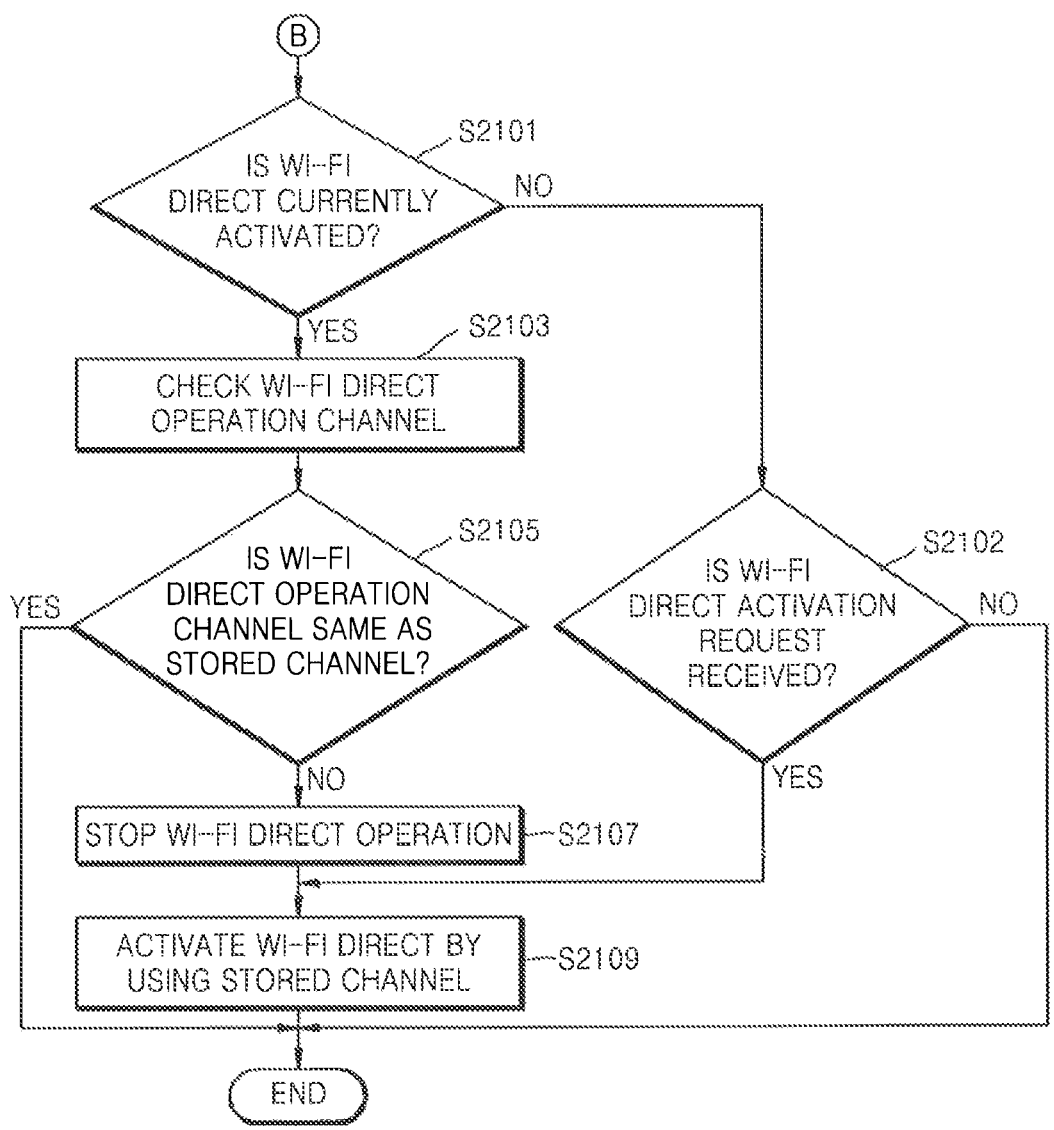
Figure 22:
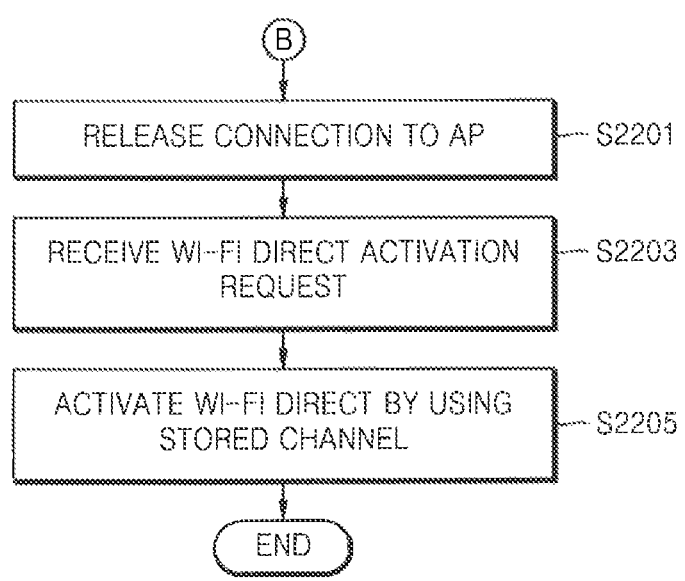

FIGS. 20 through 22 are flowcharts illustrating methods of setting the Wi-Fi Direct operation channel in a state where the MFP is connected to the AP of the infrastructured network according to exemplary embodiments of the present general inventive concept. Referring to FIG. 20, the MFP is connected to the infrastructured network AP at operation S2001, and the channel used in the connection to the AP is identified at operation S2003. The channel identified in operation S2003 is stored at operation S2005, and the stored channel is set as the Wi-Fi Direct operation channel at operation S2007. Here, sub-processes of operation S2007 for setting the stored channel as the Wi-Fi Direct operation channel are illustrated in FIGS. 21 and 22.

Referring to FIG. 21, after storing the channel identified in operation S2005 of FIG. 20, it is determined whether Wi-Fi Direct is currently activated at operation S2101. As a result of determination, if Wi-Fi Direct is currently activated, the Wi-Fi Direct operation channel is identified at operation S2103. It is determined whether the Wi-Fi Direct operation channel coincides with the stored channel at operation S2105, and if it is determined that the two channels are not the same as each other, the Wi-Fi Direct operation is stopped at operation S2107, and the stored channel is set as the Wi-Fi Direct operation channel to activate Wi-Fi Direct at operation S2109. Otherwise, if it is determined that the Wi-Fi Direct is not currently activated in operation S2101, it is identified whether there is a request for activating Wi-Fi Direct at operation S2102, and if there is a request, the stored channel is set as the Wi-Fi Direct operation channel to activate Wi-Fi Direct at operation S2109.

As another example of the sub-processes of operation S2007, referring to FIG. 22, after storing the channel identified in operation S2005 illustrated in FIG. 20, the connection between the MFP and the infrastructured network AP is disconnected at operation S2201. When the MFP receives a Wi-Fi Direct activation request at operation S2203, the stored channel is set as the Wi-Fi Direct operation channel to activate Wi-Fi Direct at operation S2205.

Figure 23:
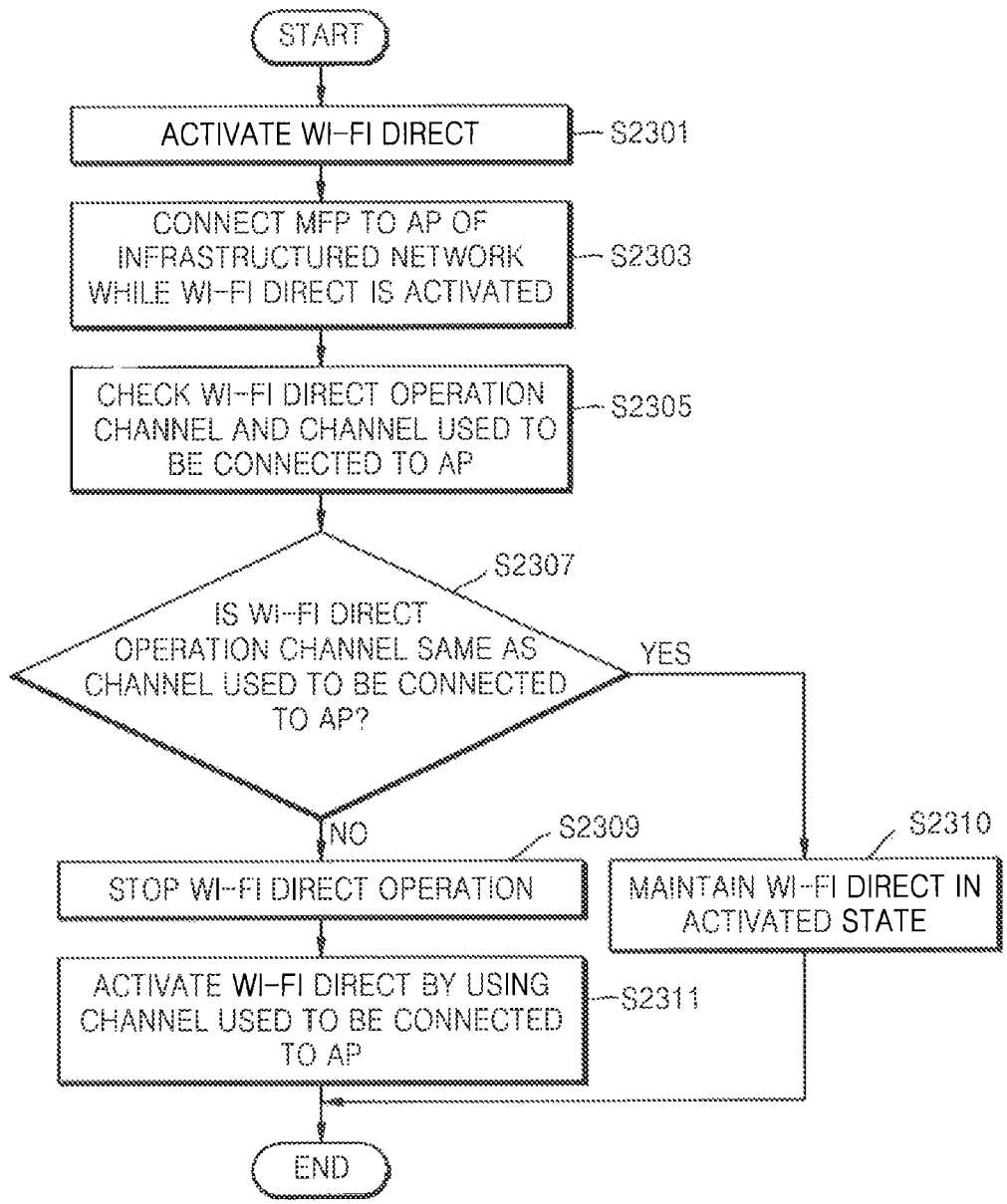

FIG. 23 is a flowchart illustrating processes of setting the Wi-Fi Direct operation channel in a state where Wi-Fi Direct of the MFP is activated. Referring to FIG. 23, Wi-Fi Direct of the MFP is activated at operation S2301, and the MFP is connected to the infrastructured network AP in a state where Wi-Fi Direct is activated at operation S2303. The Wi-Fi Direct operation channel and the channel used in the connection to the AP are identified at operation S2305. It is determined whether the Wi-Fi Direct operation channel is the same as the channel used in the connection to the AP at operation S2307, and if it is determined that the two channels are not the same as each other, the Wi-Fi Direct operation is stopped at operation S2309, and the channel used in the connection to the AP is set as the Wi-Fi Direction operation channel to activate Wi-Fi Direct at operation S2311.

The above processes will be described in detail with reference to FIG. 16, as well as FIG. 23, below. If the MFP is connected to the AP operating, for example, in channel 6 at 2.4 GHz when the Wi-Fi Direct operation channel is channel 1 at 2.4 GHz, the channel manager 1612b reads out the channel of the connected AP via the WLAN library 1618 from a wireless module and notifies the Wi-Fi Direct manager 1612a of the read channel so that the Wi-Fi Direct operation channel is changed to the channel 6. The Wi-Fi Direct manager 1612a performs a preliminary operation for changing the channel, such as termination of the soft AP, change of an information element, and termination of a device discovery operation, and then, changes the Wi-Fi Direct operation channel to the channel 6 and activates Wi-Fi Direct.

In general, since a wireless MFP performs transmission via one wireless antenna, the wireless MFP has to communicate by using one communication channel at once. Therefore, when a concurrent connection function, in which the MFP is simultaneously connected to the infrastructured network and the Wi-Fi Direct, is performed, there may be a problem in using the communication function. If two different channels are used in the connection to the infrastructured network and the Wi-Fi Direct connection, a wireless chipset of with increased CPU performance may process all of the packets while continuously reciprocating two channels in a time-division manner; however, services of each of the channels may be delayed and stability of the channels may be degraded. However, according to the method of managing the channels of the present exemplary embodiment, a single channel is used in the concurrent connection, and thus, the above problems may be addressed. Also, the channel of the infrastructured network AP is not known to the MFP before the MFP is connected to the AP; however, according to the present exemplary embodiment, even when the MFP is connected to the infrastructured network AP in a state where Wi-Fi Direct is activated first, the channel information of the AP is read and the Wi-Fi Direct operation channel is set according to the AP channel information so as to use a single channel.

Hereinafter, a method of changing an operation mode in the MFP supporting Wi-Fi Direct according to exemplary embodiments of the present general inventive concept will be described below with reference to the accompanying drawings of FIGS. 24-27. There are two kinds of WLAN usage modes of the MFP, that is, an ad-hoc mode and an infrastructured network mode. The ad-hoc mode is a mode in which the MFP is wirelessly connected to the wireless device by using ad-hoc communication, and the infrastructured network mode is a mode in which the MFP is wirelessly connected to the infrastructured network AP.

Figure 24:
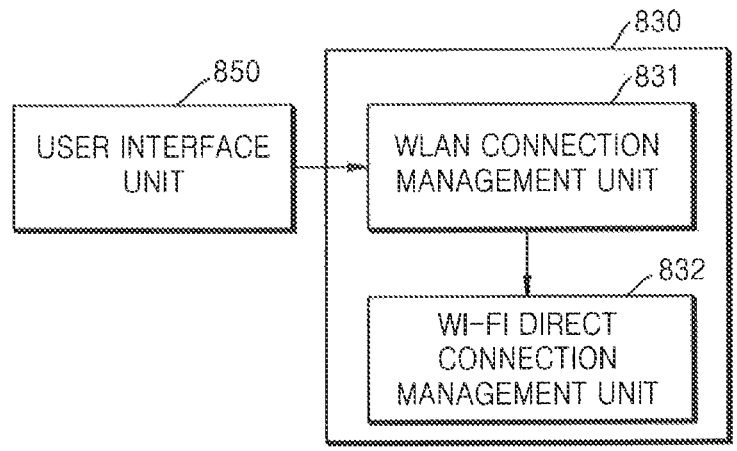
FIG. 24 is a detailed block diagram illustrating a multi-function printer supporting Wi-Fi Direct according to exemplary embodiments of the present general inventive concept.

FIG. 24 is a block diagram of the MFP supporting Wi-Fi Direct according to exemplary embodiments of the present general inventive concept. Referring back to FIG. 8 illustrating the exemplary configuration of the MFP supporting Wi-Fi Direct, as well as referring to FIG. 24, the CPU 830 may include the WLAN connection management unit 831 and the Wi-Fi Direct connection management unit 832. Detailed operations of each of the components will be described below with reference to FIGS. 25 through 27.

Figure 25:
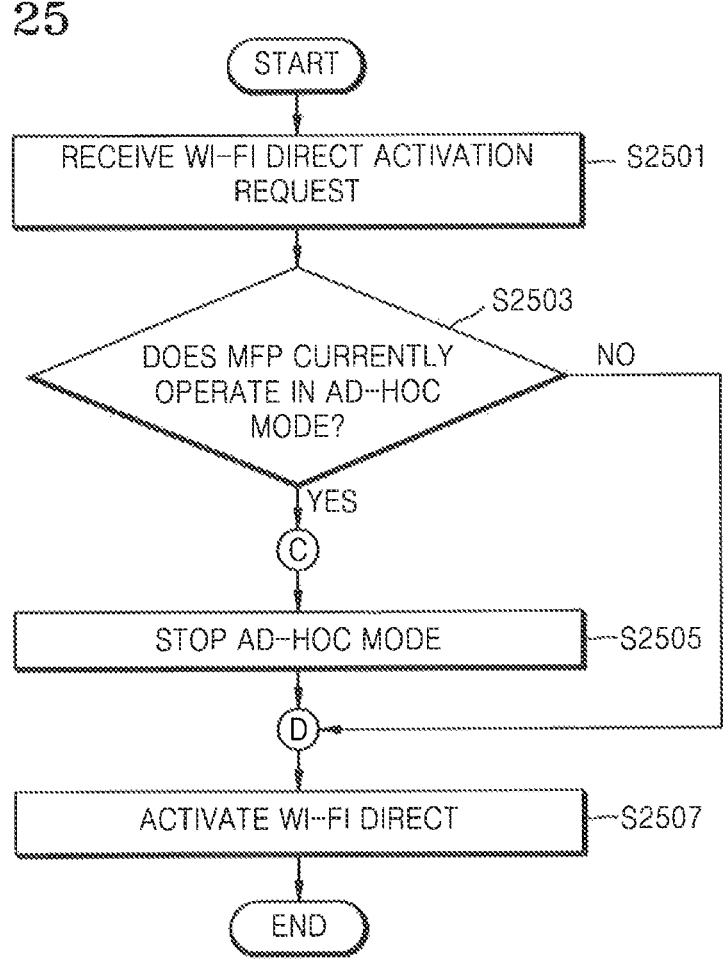
FIGS. 25 through 27 are flowcharts illustrating a method of changing an operation mode in the multi-function printer to support Wi-Fi Direct according to exemplary embodiments of the present general inventive concept.
Figure 26:
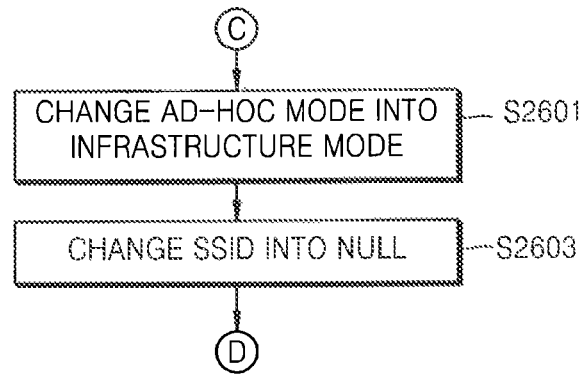
Figure 27:
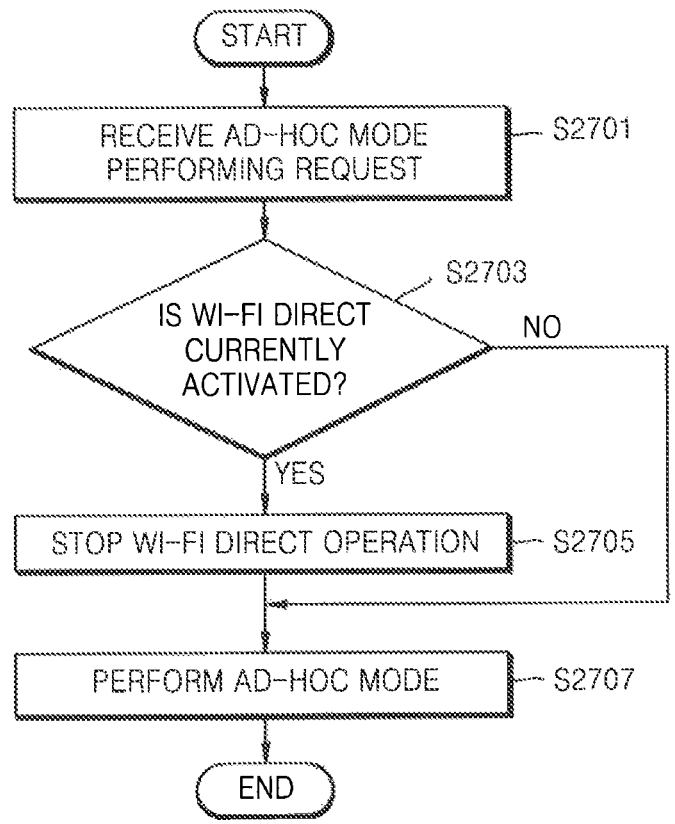

FIGS. 25 through 27 are flowcharts illustrating a method of changing the operation mode of the MFP supporting Wi-Fi Direct, according to exemplary embodiments of the present general inventive concept. Referring to FIG. 25, when a Wi-Fi Direct activation request is transmitted from a user via the user interface module 850 at operation S2501, the WLAN connection manager 831 determines whether the MFP currently operates in the ad-hoc mode at operation S2503. If it is determined that the MFP currently operates in the ad-hoc mode, the WLAN connection manager 831 terminates the ad-hoc mode and requests the Wi-Fi Direct connection management unit 832 to activate Wi-Fi Direct at operation S2505. The Wi-Fi Direct connection management unit 832 activates Wi-Fi Direct according to the request at operation S2507. Here, sub-processes of operation S2505 in which the WLAN connection manager 831 terminates the ad-hoc mode are illustrated in FIG. 26.

Referring to FIG. 26, the WLAN connection manager 831 may change the operation mode of the MFP from the ad-hoc mode to the infrastructured network mode at operation S2601. Here, the WLAN connection manager 831 may terminate (e.g., may only terminate) the ad-hoc mode without changing the operation mode to the infrastructured network mode. The SSID of the MFP, which is set for executing the ad-hoc mode, may be changed to a null state in order to terminate the ad-hoc mode at operation S2603.

Referring to FIG. 27, when an ad-hoc mode execution request is received via the user interface module 850 at operation S2701, the WLAN connection manager 831 determines whether Wi-Fi Direct of the MFP is currently activated at operation S2703. As a result of the determination, if the Wi-Fi Direct of the MFP is currently activated, the WLAN connection management unit 831 requests the Wi-Fi Direct connection management unit 832 to terminate the Wi-Fi Direct operation. Accordingly, when the Wi-Fi Direct connection management unit 832 terminates the Wi-Fi Direct operation at operation S2705, the WLAN connection manager 831 executes the ad-hoc mode at operation S2707.

Although the Wi-Fi Direct technology supports the concurrent connection function to the infrastructured network and the Wi-Fi Direct, the MFP may not be connected to the Wi-Fi Direct while operating in the ad-hoc mode. In detail, the ad-hoc mode may ensure mutual compatibility between devices under IEEE 802.11b; however, Wi-Fi Direct does not support IEEE 802.11b. Therefore, when there is a request for executing the Wi-Fi Direct mode or the ad-hoc mode while operating in the ad-hoc mode or the Wi-Fi Direct mode, a method of selectively changing the operation mode is necessary, as provided in the exemplary embodiments of the present general inventive concept.

According to the exemplary embodiments of the present general inventive concept, when activating Wi-Fi Direct according to the initialization command, the MFP may operate as a GO even if the MFP is not connected to other Wi-Fi Direct devices in order to form the Wi-Fi Direct network in advance, so that the MFP may provide connections to legacy wireless terminals that do not support Wi-Fi Direct. The MFP that is a fixed type device may perform as the GO that has an increased power consumption (e.g., a relatively large power consumption).

When the Wi-Fi Direct activation request is received while operating in the ad-hoc mode, the ad-hoc mode is terminated and Wi-Fi Direct is activated, and accordingly, a problem that the Wi-Fi Direct connection is not possible while operating in the ad-hoc mode may be addressed.

Although several embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-function printer (MFP) supporting peer to peer (P2P), the MFP comprising:
a print engine to perform a printing operation;
a first wireless interface to connect the MFP to an access point (AP) of an infrastructured network;
a second wireless interface to connect the MFP to an external wireless terminal in a P2P connection;
a soft AP to allow the MFP to perform as an AP when the MFP is P2P connected; and
a dynamic host configuration protocol (DHCP) server unit allocating an internet protocol (IP) address to the wireless device that is P2P connected to the MFP,
wherein the MFP is connected via the first wireless interface and the second wireless interface by using one channel.

2. The MFP of claim 1, further comprising:
a channel manager to manage channels used in connections via the first wireless interface and the second wireless interface,
wherein the channel manager changes the channel used in the connection via the second wireless interface to be the same as the channel used in the connection via the first wireless interface, when the MFP is connected to the AP of the infrastructured network via the first wireless interface.

3. The MFP of claim 2, wherein when the MFP is P2P connected to the external wireless terminal via the second wireless interface in a state where the MFP is already connected to the AP of the infrastructured network via the first wireless interface, the channel manager performs the connection through the second wireless interface by using the channel used in the connection through the first wireless interface.

4. The MFP of claim 2, further comprising:
a channel storage unit to store channels,
wherein the channel manager stores the channel used in the connection via the first wireless interface when the MFP is connected to the AP of the infrastructured network via the first wireless interface, and uses the stored channel when the MFP is P2P connected to the external wireless terminal via the second wireless interface.

5. The MFP of claim 4, wherein the channel manager stores the channel used in the connection via the first wireless interface in the channel storage unit, together with information about the AP including a service set identifier (SSID) of the AP of the infrastructured network to which the MFP is connected via the first wireless interface.

6. A method of managing a channel in a multi-function printer (MFP) supporting peer to peer (P2P), the method comprising:
connecting the MFP to an access point (AP) of an infrastructured network via a first wireless interface; and
connecting the MFP to an external wireless terminal in a P2P communication via a second wireless interface by using a channel used in the connection via the first wireless interface.

7. The method of claim 6, further comprising:
storing the channel used in the connection via the first wireless interface; and
connecting the MFP to the external wireless terminal in the P2P communication via the second wireless interface by using the stored channel.

8. The method of claim 7, wherein the storing of the channel comprises storing information about the AP including a service set identifier (SSID) of the AP of the infrastructured network to which the MFP is connected via the first wireless interface.

9. The method of claim 6, wherein the P2P connecting of the MFP comprises:
driving a soft AP of the MFP so that the MFP functions as the AP; and
driving a DHCP server of the MFP to allocate an Internet protocol (IP) address to the wireless terminal, to which the MFP is P2P connected.

10. A method of managing a channel in a multi-function printer (MFP) supporting peer to peer (P2P), the method comprising:
connecting the MFP to an access point (AP) of an infrastructured network via a first wireless interface; and
determining whether the MFP is P2P connected to an external wireless device via a second wireless interface;
if the MFP is P2P connected to the external wireless terminal, determining whether a channel used in the connection via the first wireless interface is the same as a channel used in the connection via the second wireless interface; and
if the channels are not the same as each other, changing the channel used in the connection via the second wireless interface to be the same as the channel used in the connection via the first wireless interface.

11. A non-transitory computer readable recording medium having embodied thereon a program, that when executed by a computer, performs a method of managing a channel in a multi-function printer (MFP) supporting peer to peer (P2P), the method comprising:
connecting the MFP to an access point (AP) of an infrastructured network via a first wireless interface; and
connecting the MFP to an external wireless terminal in a P2P communication via a second wireless interface by using a channel used in the connection via the first wireless interface.

12. The non-transitory computer readable medium of claim 11, further comprising:
storing the channel used in the connection via the first wireless interface; and
connecting the MFP to the external wireless terminal in the P2P communication via the second wireless interface by using the stored channel.

13. The non-transitory computer readable medium of claim 12, wherein the storing of the channel comprises storing information about the AP including a service set identifier (SSID) of the AP of the infrastructured network to which the MFP is connected via the first wireless interface.

14. The non-transitory computer readable medium of claim 11, wherein the P2P connecting of the MFP comprises:
driving a soft AP of the MFP so that the MFP functions as the AP; and
driving a DHCP server of the MFP to allocate an Internet protocol (IP) address to the wireless terminal, to which the MFP is P2P connected.

15. A non-transitory computer readable recording medium having embodied thereon a program, that when executed by a computer, performs a method of managing a channel in a multi-function printer (MFP) supporting peer to peer (P2P), the method comprising:

connecting the MFP to an access point (AP) of an infrastructured network via a first wireless interface; and
determining whether the MFP is P2P connected to an external wireless device via a second wireless interface;
if the MFP is P2P connected to the external wireless terminal, determining whether a channel used in the connection via the first wireless interface is the same as a channel used in the connection via the second wireless interface; and
if the channels are not the same as each other, changing the channel used in the connection via the second wireless interface to be the same as the channel used in the connection via the first wireless interface.

16. A method of managing channels in a multi-function printer (MFP) supporting peer to peer (P2P), the method comprising:
setting a channel used to connect the MFP to an infrastructured network access point (AP) as a P2P operation channel; and
activating the P2P communication using the set channel.

17. The method of claim 16, wherein the setting the channel further comprises:
determining whether the MFP is currently connected to the AP of the infrastructure network;
checking the channel to be connected to the AP when the MFP is determined to be currently connected to the AP of the infrastructure network; and
setting the checked channel as the channel as the P2P operation channel.

18. The method of claim 16, wherein the setting the channel further comprises:
determining whether the MFP is currently connected to the AP of the infrastructure network; and
determining whether the MFP has been previously connected to the AP of the infrastructure network when the MFP is determined to be currently connected to the AP of the infrastructure network;
checking the channel used in a last connection to the AP, when it is determined that the MFP has been previously connected to the AP of the infrastructure network; and
setting the checked channel as the channel used to be connected to the P2P communication.

19. The method of claim 16, further comprising:
determining whether the MFP is currently connected to the AP of the infrastructure network; and
determining whether the MFP has been previously connected to the AP of the infrastructure network when the MFP is determined not to be currently connected to the AP of the infrastructure network; and
setting an arbitrary channel as the P2P operation channel.

20. A method of setting a peer to peer (P2P) operation channel, the method comprising:
connecting a multi-function printer (MFP) to an access point (AP) of an infrastructure network;
checking a channel used to be connected to the AP;
storing information on the checked channel; and
setting the stored channel as the P2P operation channel.

21. The method of claim 20, further comprising:
determining whether the P2P communication is currently activated when the information on the checked channel is stored;
checking the P2P operation channel when the P2P communication is currently activated;
determining whether the P2P operation channel is the same as the stored channel;
stopping a P2P operation when the P2P operation channel is different from the stored channel; and
activating P2P communication by using the stored channel.

22. The method of claim 20, further comprising:
determining whether the P2P communication is currently activated when the information on the checked channel is stored;
determining if the P2P communication activation request is received when the P2P activation is not currently activated; and
activating the P2P communication by using the stored channel.

23. The method of claim 20, further comprising:
releasing the connection to the AP when the information on the checked channel is stored;
receiving a P2P communication activation request; and
activating the P2P communication using stored channel.

24. A method of setting a peer to peer (P2P) operation channel in a state when a P2P communication of the multi-function printer (MFP) is activated, the method comprising:
connecting the MFP to an access point (AP) of the infrastructure network when the P2P communication is activated;
checking the P2P operation channel and channel used to be connected to the AP;
determining if the P2P operation channel is the same as a channel used to be connected to the AP; and
stopping the P2P operation and activating the P2P communication by using the channel used to be connected to the AP when the P2P operation channel is the same as a channel used to be connected to the AP.

25. The method of claim 24, further comprising:
maintaining the P2P communication in an activated stated when the P2P operation channel is different from the channel used to be connected to the AP.

* * * * *